(12) United States Patent
Yabuta et al.

(10) Patent No.: US 8,859,647 B2
(45) Date of Patent: Oct. 14, 2014

(54) ANTISTATIC RESIN COMPOSITION

(75) Inventors: Takashi Yabuta, Kyoto (JP); Hidetoshi Noda, Kyoto (JP); Masanori Hattori, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 181 days.

(21) Appl. No.: 13/384,598

(22) PCT Filed: Jul. 30, 2010

(86) PCT No.: PCT/JP2010/004855
§ 371 (c)(1),
(2), (4) Date: Jan. 18, 2012

(87) PCT Pub. No.: WO2011/013386
PCT Pub. Date: Feb. 3, 2011

(65) Prior Publication Data
US 2012/0128945 A1    May 24, 2012

(30) Foreign Application Priority Data

Jul. 31, 2009  (JP) ................................ 2009-179758

(51) Int. Cl.
*C08J 3/22* (2006.01)
*C08K 5/00* (2006.01)
*C08L 51/04* (2006.01)

(52) U.S. Cl.
CPC .............. *C08K 5/0075* (2013.01); *C08L 51/04* (2013.01); *C08L 2201/04* (2013.01)
USPC ........... 523/351; 524/505; 524/507; 524/513; 524/514; 524/537; 524/538; 524/539

(58) Field of Classification Search
USPC .......... 523/351; 524/505, 507, 513, 514, 537, 524/538, 539
See application file for complete search history.

(56) References Cited

U.S. PATENT DOCUMENTS 3,692,877 A    9/1972 Shibahara et al.

FOREIGN PATENT DOCUMENTS

| JP | H03-062804 | 3/1991 |
|---|---|---|
| JP | H03-258850 | 11/1991 |
| JP | H05-140541 | 6/1993 |
| JP | H06-345927 | 12/1994 |
| JP | H09-291192 | 11/1997 |
| JP | H10-204247 | 8/1998 |
| JP | H11-255894 | 9/1999 |
| JP | 2001-278985 | 10/2001 |
| JP | 2002-284880 | 10/2002 |
| JP | 2004-217929 | * 8/2004 |
| JP | 2005-097598 | 4/2005 |
| JP | 2007-231254 | 9/2007 |
| JP | 2008-133469 | 6/2008 |
| WO | 95/15572 | 6/1995 |
| WO | 00/47652 | 8/2000 |

OTHER PUBLICATIONS

Robert F. Fedors, "A Method for Estimating Both the Solubility Parameters and Molar Volumes of Liquids", Polymer Engineering and Science, Feb. 1974, pp. 147-154, vol. 14, Issue No. 2.

Lu et al., "Maleic Anhydride Modified Polypropylene with Controllable Molecular Structure: New Synthetic Route via Borane-Terminated Polypropylene" Macromolecules, Aug. 6, 1998, pp. 5943-5946, vol. 31, Issue No. 17.

"Office Action of Japan Counterpart Application", with English translation thereof, mailed on May 27, 2014, p. 1-p. 12, in which references were cited.

Kiyoshi Akamatsu, "New Technologies and Applications of Untistatic Agent and Materials", with English summaries thereof, Apr. 15, 1996, pp. 93-94, pp. 101-102.

* cited by examiner

*Primary Examiner* — Edward Cain
(74) *Attorney, Agent, or Firm* — Jianq Chyun IP Office

(57) ABSTRACT

An antistatic resin composition is provided, from which a thermoplastic resin molded article having a sufficient permanent antistatic property without impairing an excellent mechanical property or a good appearance of the molded article, even in a case that the content of an antistatic agent contained in the composition is less than that in a conventional composition, is provided. The antistatic resin composition contains an antistatic agent (A) and a thermoplastic resin (B), in which a melt viscosity ratio of the thermoplastic resin (B) to the antistatic agent (A) at 220° C. is 0.5-5 and an absolute value of a difference between solubility parameters (SPs) of the antistatic agent (A) and the thermoplastic resin (B) is 1.0-3.0. The antistatic resin molded article is obtained by molding the antistatic resin composition.

15 Claims, No Drawings

ANTISTATIC RESIN COMPOSITION

CROSS-REFERENCE TO RELATED APPLICATION

This application is a 371 of international application of PCT application serial no. PCT/JP2010/004855, filed on Jul. 30, 2010, which claims the priority benefit of Japan application no. 2009-179758, filed on Jul. 31, 2009. The entirety of each of the above-mentioned patent applications is hereby incorporated by reference herein and made a part of this specification.

BACKGROUND OF THE INVENTION

1. Field of the Invention

The present invention generally relates to an antistatic resin composition. More particularly, the present invention relates to an antistatic resin composition, which imparts an excellent permanent antistatic property to a thermoplastic resin molded article without impairing the excellent mechanical property or the good appearance of the molded article.

2. Description of Related Art

In the prior art, a known method for imparting an antistatic property to a high insulating thermoplastic resin includes, for example, (1) an addition of a low molecular weight surfactant; and (2) an addition of a metal filler or conductive carbon black. However, a molded article formed by molding a resin composition obtained through the method (1) achieves the antistatic effect by the bleeding out the low molecular weight surfactant, so that in addition to the loss of the antistatic effect due to, for example, surface cleaning, the disadvantage of surface irregularity occurs with time. Furthermore, although a molded article obtained through the method (2) has an excellent long-lasting antistatic effect, a large amount of metal filler must be added, causing a problem of decreased impact resistance. Therefore, a method (3) is proposed to solve the problems, in which, for example, a polymer-based antistatic agent such as polyether-ester-amide (PEEAM) is added into the resin. Moreover, a method in which a PEEAM having a specific dicarboxylic acid as a structure unit is added into the resin (see, for example, Patent Document 1) or a method in which a smaller amount of PEEAM incorporated with an ionic polymer is added into the resin (see, for example, Patent Document 2) is also proposed.

LITERATURES IN THE PRIOR ART

Patent Documents

Patent Document 1: Japanese Patent Publication No. 1999-255894
Patent Document 2: Japanese Patent Publication No. 1993-140541

SUMMARY OF THE INVENTION

Technical Problems to be Solved in the Present Invention

However, in the method (3) in which a PEEAM is added into the resin, when the PEEAM is added in an amount of 10% or below, a sufficient antistatic property cannot be imparted; however, if the PEEAM is added in an amount of above 10%, although the antistatic property is acceptable, there is a disadvantage of degraded mechanical property. Furthermore, as described in the methods exemplified in Patent Documents 1 and 2 in which the PEEAM having a specific structure is added into the resin, although the mechanical property or appearance of the molded article is not impaired, but the antistatic property is unsatisfactory.

The present invention is directed to an antistatic resin composition, in which a thermoplastic resin molded article having a sufficiently permanent antistatic property is provided, while the excellent mechanical property or the good appearance of the molded article is not compromised, even in a case that the content of an antistatic agent contained in the composition is less than that in the prior art.

Technical Means for Solving the Technical Problems

In order to solve the above problems, the inventors carry out intensive research, and thus the present invention is accomplished. The antistatic resin composition of the present invention contains an antistatic agent (A) and a thermoplastic resin (B), in which a melt viscosity ratio of the thermoplastic resin (B) to the antistatic agent (A) at 220° C. is 0.5-5 and an absolute value of a difference between the solubility parameters (SPs) of the antistatic agent (A) and the thermoplastic resin (B) is 1.0-3.0.

Invention Effects

The antistatic resin composition of the present invention has the following effects.

(1) Even if the content of the antistatic agent contained in the composition is less than that in the prior art, a molded article having an excellent permanent antistatic property can also be provided.

(2) The molded article formed by molding the composition has an excellent appearance and mechanical property.

BRIEF DESCRIPTION OF THE DRAWINGS

No drawings.

DESCRIPTION OF THE EMBODIMENTS

[Antistatic Agent (A)]

The antistatic agent (A) in the present invention is one which meets the following conditions. A melt viscosity ratio of a thermoplastic resin (B) described below to the antistatic agent (A) at 220° C. is 0.5-5, preferably 0.7-3.5, more preferably 0.8-2.5, and especially preferably 0.9-1.5, and an absolute value of a difference between SPs of the antistatic agent (A) and the thermoplastic resin (B) is 1.0-3.0, preferably 1.1-2.5, and more preferably 1.2-2.0.

In case that either or both of the melt viscosity ratio and the absolute value of the difference between the SPs are beyond the above ranges, any one or all of the appearance, the mechanical property, and the antistatic property of a molded article described below are impaired.

If the thermoplastic resin (B) and the antistatic agent (A) meet the conditions of the melt viscosity ratio and the absolute value of the difference between the SPs, the above effects of the present invention are exhibited. The mechanism is still unclear, and is postulated to be that [1] when the difference between the SPs is in the above range, the dissolution of the antistatic agent in the resin is inhibited, and the antistatic agent can be easily transferred to a surface layer of the molded article, so that the concentration of the antistatic agent on the surface layer is increased; and [2] when the melt viscosity ratio is in the above range, even if the concentration of the antistatic agent is increased, the antistatic agent is well dispersed in the resin, and no adverse effect is imparted on the appearance and the mechanical property of the molded article.

In addition, the melt viscosity may be determined according to JIS K 7199, by using a capillary rheometer ["capillary rheometer model PD-C", manufactured by Toyo Seiki Manufacturing Co., Ltd] at 220° C. at a shear rate of 600 s$^{-1}$, and the melt viscosity ratio of the thermoplastic resin (B) to the antistatic agent (A) may be calculated by an equation below:

Melt viscosity ratio=$\rho(B)/\rho(A)$ where $\rho(A)$ and $\rho(B)$ respectively represent the melt viscosity of the antistatic agent (A) and the thermoplastic resin (B) at 220° C. (unit: Pa·s/shear rate 600 s$^{-1}$).

In addition, the so-called SP (unit: (cal/cm$^3$)$^{1/2}$) refers to a value defined by an equation below by setting a cohesive energy density to be $\Delta E$ (unit: cal/mol) and setting a molecular volume to be V (unit: cm$^3$/mol). In addition, the following situation exists, in which the SPs of the antistatic agent (A) and the thermoplastic resin (B) are denoted as $SP_A$ and $SP_B$, and the absolute value of the difference between the SPs of the antistatic agent (A) and the thermoplastic resin (B) are expressed as $|SP_A\text{-}SP_B|$.

SP=$(\Delta E/V)^{1/2}$

A specific method for calculating SP is known, for example, Fedors method, which is described, together with the SP calculated by using the method, in "A Method for Estimating both the Solubility Parameters and Molar Volumes of Liquids, POLYMER ENGINEERING AND SCIENCE, FEBRUARY, 1974, vol. 14, Issue 2, p. 147-154", and the method may be used in the present invention.

In view of the antistatic property, the antistatic agent (A) which meets the requisite of the melt viscosity ratio and the absolute value of the difference between the SPs is preferably a block polymer having a structure formed by alternatively bonding a block of a hydrophilic polymer (a) having a volume intrinsic resistance of $1 \times 10^5$–$1 \times 10^{11}$ $\Omega$·cm and a block of a hydrophobic polymer (b) with at least a bond selected from the group consisting of an ester bond, an amide bond, an ether bond, a urethane bond, a urea bond and an imide bond.

[Hydrophilic Polymer (a)]

The hydrophilic polymer (a) forming the block polymer includes, for example, at least one selected from the group consisting of a polyether (a1), a cationic polymer (a2), and an anionic polymer (a3).

The polyether (a1) includes, for example, a polyether diol (a11), a polyether diamine (a12), or a modified product thereof (a13).

The cationic polymer (a2) includes, for example, a polymer having, in a molecule, 2-80 and preferably 3-60 cationic groups (c2) that are spaced by a non-ionic molecule chain (c1).

The anionic polymer (a3) includes, for example, an anionic polymer which has a sulfo bearing dicarboxylic acid (e1), and a diol (a0) or a polyether (a1) as essential structure units, and has 2-80 and preferably 3-60 sulfo groups in a molecule.

The polyether (a1) is described.

Among the polyether (a1), the polyether diol (a11) is a structure obtained by subjecting an alkylene oxide (referred to as AO hereinafter) and a diol (a0) to an addition reaction, and for example, a polyether glycol represented by a general formula of H—(OA$^1$)$_m$-O-E$^1$-O-(A$^1$O)$_{m'}$—H.

In the formula, E$^1$ represents a residue obtained by removing a hydroxyl group from the diol (a0), A$^1$ represent an alkylene group having 2 to 4 carbon atoms (referred to as C hereinafter), and m and m' represent the number of AO added relative to 1 hydroxyl group in the diol (a0). m (OA$^1$) and m' (A$^1$O) may be the same or different. In addition, in case that two or more different oxyalkylene groups exist, the bonding thereof may be in the form of a block or random bonding, or a combination thereof. m and m' are generally an integer of 1-300, preferably 2-250, and more preferably 10-100. Furthermore, m and m' may be the same or different.

The diol (a0) includes, for example, a dihydric alcohol (e.g. C2-12 aliphatic dihydric alcohol, alicyclic containing dihydric alcohol, and aromatic ring containing dihydric alcohol), a C6-18 dihydric phenol, or a tertiary amino containing diol.

The aliphatic dihydric alcohol includes, for example, an alkylene glycol [e.g. ethylene glycol, and propylene glycol (which are respectively referred to as EG and PG hereinafter)], 1,4-butanediol, 1,6-hexanediol, neopentyl glycol (which are respectively referred to as 1,4-BD, 1,6-HD, and NPG hereinafter), or 1,12-dodecanediol.

The alicyclic dihydric alcohol is, for example, cyclohexanedimethanol.

The aromatic ring containing dihydric alcohol includes, for example, xylylenediol.

The dihydric phenol includes, for example, a monocyclic dihydric phenol (e.g. hydroquinone, catechol, resorcin, urushiol, or the like), a bisphenol (bisphenol A, bisphenol F, bisphenol S, 4,4'-dihydroxydiphenyl-2,2-butane, dihydroxybiphenyl, and the like), or a condensed polycylic dihydric phenol (e.g. dihydroxynaphthalene, binaphthol, or the like).

The tertiary amino containing diol includes, for example, a bishydroxyalkylate of a C1-12 aliphatic primary monoamine or alicyclic containing primary monoamine (e.g. methylamine, ethylamine, 1-propylamine, 2-propylamine, hexylamine, decylamine, dodecylamine, cyclopropylamine, cyclohexylamine, and the like), or a bishydroxyalkylate of a C6-12 aromatic ring containing primary monoamine (e.g. aniline, benzyl amine, or the like).

Among the diols, in view of the antistatic property, the aliphatic dihydric alcohol and the bisphenol are preferred, and EG and bisphenol A are more preferred.

The polyether diol (a11) may be prepared by subjecting an AO and the diol (a0) to an addition reaction.

AO is a C2-4 AO [e.g. ethylene oxide, propylene oxide, 1,2-butylene oxide, 1,4-butylene oxide, 2,3-butylene oxide, or 1,3-butylene oxide (which are respectively referred to as EO, PO, and BO hereinafter)], or a combination of two or more thereof, which may be optionally combined with a small proportion (for example, 30% or below based on the total weight of the AOs) of other AOs or substituted AOs (a system containing the AOs is generically referred to as AO hereinafter), for example, a C5-12 α-olefin, styrene oxide or epihalohydrin (e.g. epichlorohydrin, or the like).

When two or more AOs are used in combination, a bonding form may take a random and/or block form. AO is preferably EO alone, and a combination of EO and other AOs (random and/or block addition). The number of AO added is generally 1-300, preferably 2-250, and more preferably 10-100 relative to 1 hydroxyl group in the diol (a0).

AO may be added by using a known method, for example, the addition is carried out at a temperature of 100-200° C. in the presence of a base catalyst. The content of the C2-4 oxyalkylene unit in the polyether diol (a11) is generally 5-99.8%, preferably 8-99.6%, and more preferably 10-98%.

The content of the oxyethylene unit in the oxyalkylene chain is generally 5-100%, preferably 10-100%, more preferably 50-100%, and especially preferably 60-100%.

The polyether diamine (a12) may be a polyether diamine represented by a general formula H$_2$N-A$^2$-(OA$^1$)$_m$-O-E$^1$-O-(A$^1$O)$_{m'}$-A$^2$-NH$_2$ (in which the variables E$^1$, A$^1$, m, and m' are the same as those described above, $A^2$ is a C2-4 alkylene, and $A^1$ and $A^2$ may be the same or different).

The polyether diamine (a12) may be obtained by using a known method, by converting a hydroxyl group in the polyether diol (a11) into an amino group, for example, the hydroxyl group in the polyether diol (a11) is cyanoalkylated and then a resulting terminal is reduced into an amino group to form the polyether diamine.

For example, the polyether diol (a11) is reacted with acrylonitrile; then, a resulting cyanoethylate is hydrogenated to form the polyether diamine (a12).

The modified product (a13) includes, for example, an aminocarboxylic acid modified product (with a terminal amino group) of the polyether diol (a11) or the polyether diamine (a12), an isocyanate modified product (with a terminal isocyanato group) of the polyether diol (a11) or the polyether diamine (a12), or an epoxy modified product (with a terminal epoxy group) of the polyether diol (a11) or the polyether diamine (a12).

The aminocarboxylic acid modified product may be obtained by reacting the polyether diol (a11) or the polyether diamine (a12) with an aminocarboxylic acid or a lactam.

The isocyanate modified product may be obtained by reacting the polyether diol (a11) or the polyether diamine (a12) with a polyisocyanate as described below, or reacting the polyether diamine (a12) with phosgene.

The epoxy modified product may be obtained by reacting the polyether diol (a11) or the polyether diamine (a12) with a diepoxide (e.g. an epoxy resin such as diglycidyl ether, diglycidyl ester, or alicyclic diepoxide, or the like with an epoxy equivalent of 85-600), or reacting the polyether diol (a11) with epihalohydrin (e.g. epichlorohydrin, or the like).

The number average molecular weight [referred to as Mn hereinafter, which is determined by gel permeation chromatography (GPC) as described below] of the polyether (a1) is generally 150-20,000, and is preferably 300-18,000, more preferably 500-15,000, and especially preferably 1,200-8,000 in view of the thermal resistance and the reactivity with the hydrophobic polymer (b) described below.

The determination conditions of the Mn are described as follows. Mn below is determined at the same conditions:
Apparatus: high-temperature GPC
Solvent: o-dichlorobenzene
Reference material: polystyrene
Sample concentration: 3 mg/mL
Column temperature: 135° C.

Hereinafter, the cationic polymer (a2) is described. The cationic polymer (a2) is a hydrophilic polymer having, in a molecule, 2-80 and preferably 3-60 cationic groups (c2) which are spaced by a non-ionic molecule chain (c1).

The cationic group (c2) includes a group having a quaternary ammonium salt or phosphonium salt. The counter anion of the cationic group (c2) includes an anion of a superacid and other anions.

The anion of a superacid includes, for example, an anion of a superacid (e.g. tetrafluoroboric acid, hexafluorophosphoric acid, or the like) derived from a combination of a protonic acid (d1) and a Lewis acid (d2), or an anion of trifluoromethanesulfonic acid, or the like.

Other anions include, for example, a halide ion (e.g. $F^-$, $Cl^-$, $Br^-$, and $I^-$), $OH^-$, $PO_4^-$, $CH_3OSO_4^-$, $C_2H_5OSO_4^-$, $ClO_4^-$, or the like.

Specific examples of the protonic acid (d1) from which the superacid is derived include, for example, hydrogen fluoride, hydrogen chloride, hydrogen bromide, hydrogen iodide, or the like.

Furthermore, specific examples of the Lewis acid (d2) include, for example, boron trifluoride, phosphorus pentafluoride, antimony pentafluoride, arsenic pentafluoride, tantalum pentafluoride, or the like.

The non-ionic molecule chain (c1) includes, for example, an divalent organic group such as at least one divalent hydrocarbyl group or the like selecting from the group consisting of a divalent hydrocarbyl group, a hydrocarbyl group having an ether bond, a thioether bond, a carbonyl bond, an ester bond, an imino bond, an amide bond, an imide bond, a urethane bond, a urea bond, a carbonate bond and/or silyloxy bond, and a hydrocarbyl group having a heterocyclic structure containing a nitrogen atom or an oxygen atom; or a combination of two or more thereof.

In the non-ionic molecule chain (c1), a divalent hydrocarbyl and a divalent hydrocarbyl having an ether bond are preferred.

In view of the antistatic property and the reactivity with the hydrophobic polymer (b) described below, Mn of the cationic polymer (a2) is preferably 500-20,000, more preferably 1,000-15,000, and especially preferably 1,200-8,000.

Specific examples of the cationic polymer (a2) include, for example, the cationic polymer described in Japanese Patent Publication No. 2001-278985.

Next, the polymer (a3) having an anionic group is described. The anionic polymer (a3) is an anionic polymer which has a sulfo bearing dicarboxylic acid (e1), and a diol (a0) or a polyether (a1) as essential structure units, and has 2-80 and preferably 3-60 sulfo groups in a molecule.

The dicarboxylic acid (e1) may be a sulfo bearing aromatic dicarboxylic acid, a sulfo bearing aliphatic dicarboxylic acid, and a dicarboxylic acid derived by converting only the sulfo group of above dicarboxylic acids into a salt.

The sulfo bearing aromatic dicarboxylic acid includes, for example, 5-sulfoisophthalic acid, 2-sulfoisophthalic acid, 4-sulfoisophthalic acid, 4-sulfo-2,6-naphthalic acid or a derivative of the aromatic dicarboxylic acids in an ester form [e.g. a lower alkyl (C1-4) ester (e.g. methyl ester, ethyl ester, or the like), an anhydride, or the like].

The sulfo bearing aliphatic dicarboxylic acid includes, for example, sulfosuccinic acid or a derivative thereof in an ester form [e.g. a lower alkyl (C1-4) ester (e.g. methyl ester, ethyl ester, or the like), an anhydride, or the like].

The dicarboxylic acid derived by converting only the sulfo group of above dicarboxylic acids into a salt includes, for example, an alkali metal (e.g. lithium, sodium, potassium, or the like) salt, an alkaline earth metal (e.g. magnesium, calcium, or the like) salt, an ammonium salt, an amine salt of a monoamine, diamine, triamine or the like having a hydroxylalkyl (C2-4) group (e.g. an organic amine salt of monoethylamine, diethylamine, triethylamine, monoethanol amine, diethanol amine, triethanol amine, diethylethanol amine, or the like), a quaternary ammonium salt thereof, or a combination of two or more thereof.

Among the aromatic dicarboxylic acids, a sulfo bearing aromatic dicarboxylic acid is preferred, a salt of 5-sulfoisophthalic acid is more preferred, and sodium 5-sulfoisophthalate and potassium 5-sulfoisophthalate are especially preferred.

Among the diol (a0) or the polyether (a1) forming the anionic polymer (a3), preferred are a C2-10 alkylene diol, EG, polyethylene glycol (referred to as PEG hereinafter) (having a polymerization degree of 2-20), an EO adduct (with an addition mole number being 2-60) of a bisphenol (e.g. bisphenol A, or the like), and a mixture of two or more thereof.

The anionic polymer (a3) may be prepared by directly using a general preparation method of polyester. Polyesterification is generally conducted at a temperature ranging from 150 to 240° C. under a reduced pressure, and the reaction time is 0.5-20 hrs. In addition, in the esterification reaction, a catalyst used in a general esterification reaction may be optionally used.

The catalyst for esterification includes, for example, an antimony catalyst (e.g. antimony trioxide, or the like), a tin catalyst (e.g. monobutyltin oxide, dibutyltin oxide, or the like), a titanium catalyst (e.g. tetrabutyl titanate, or the like), a zirconium catalyst (e.g. tetrabutyl zirconate, or the like), and a metal acetate catalyst (e.g. zinc acetate, or the like).

In view of the antistatic property and the reactivity with the hydrophobic polymer (b) described below, Mn of the anionic polymer (a3) is preferably 500-20,000, more preferably 1,000-15,000, and especially preferably 1,200-8,000.

[Hydrophobic Polymer (b)]

The hydrophobic polymer (b) in the present invention includes at least one hydrophobic polymer selected from the group consisting of a polyolefin (b1), a polyamide (b2), a polyamide-imide (b3), and a polyester (b4). The so-called hydrophobic polymer refers to a polymer which has a surface intrinsic resistance of $1 \times 10^{14}$ to $1 \times 10^{17} \Omega$.

The polyolefin (b1) may be a polyolefin (b11) which has a carbonyl group (and preferably carboxyl group, the same below) at two terminals of the polymer, a polyolefin (b12) which has a hydroxyl group at two terminals of the polymer, a polyolefin (b13) which has an amino group at two terminals of the polymer, a polyolefin (b14) which has an isocyanato group at two terminals of the polymer, or the like.

In addition, a polyolefin (b15) which has a carbonyl group at one terminal of the polymer, a polyolefin (b16) which has a hydroxyl group at one terminal of the polymer, a polyolefin (b17) which has an amino group at one terminal of the polymer, a polyolefin (b18) which has an isocyanato group at one terminal of the polymer, or the like may also be used.

Among the polyolefin, in view of the ease of the modification, the polyolefin (b11) and (b15) having a carbonyl are preferred.

(b11) is obtained by introducing a carbonyl group at two terminals of a polyolefin (b10) that has a polyolefin having two modifiable terminals as a main component in a content of preferably 50% or higher, more preferably 75% or higher, and especially preferably 80-100%.

(b12) is obtained by introducing a hydroxyl group at two terminals of (b10).

(b13) is obtained by introducing an amino group at two terminals of (b10).

(b14) is obtained by introducing an isocyanato group at two terminals of (b10).

(b15) is obtained by introducing a carbonyl group at one terminal of a polyolefin (b100) that has a polyolefin having one modifiable terminal as a main component in a content of preferably 50% or higher, more preferably 75% or higher, and especially preferably 80-100%).

(b16) is obtained by introducing a hydroxyl group at one terminal of (b100).

(b17) is obtained by introducing an amino group at one terminal of (b100).

(b18) is obtained by introducing an isocyanato group at one terminal of (b100).

(b10) includes a polyolefin obtained through (co)polymerization (that is, polymerization or copolymerization, the same below) of a mixture of one or two or more C2-30 (preferably 2-12, and more preferably 2-10) olefins (polymerization method) or a degraded polyolefin [obtained by mechanically, thermally, or chemically degrading a high-molecular weight polyolefin (which preferably has an Mn of 50,000-150,000)] (degradation method).

In view of easy modification by introducing the carbonyl group, the hydroxyl group, the amino group, or the isocyanato group, and the easy availability, a degraded polyolefin and especially a thermally degraded polyolefin are preferred.

The thermally degraded polyolefin is not particularly limited, and may include a polyolefin (for example, the polyolefin described in Japanese Patent Publication No. 1991-62804) obtained by thermally degrading a high-molecular weight polyolefin by heating in an inert gas atmosphere (generally by heating at 300-450° C. for 0.5-10 hrs). The high-molecular weight polyolefin used in the thermal degradation method may be a (co)polymer of a mixture of one or two or more C2-30 (preferably 2-12, and more preferably 2-10) olefins, or the like. The C2-30 olefin may be the same as that used in preparation of the polyolefin (polymerization method) described below. Among the olefins, ethylene, propylene, a C4-12 α-olefin, and a mixture of two or more thereof are preferred, ethylene, propylene, a C4-10 α-olefin, and a mixture of two or more thereof are more preferred, and ethylene, propylene, and a mixture of two or more thereof are especially preferred.

The C2-30 olefin used in preparation of the polyolefin (polymerization method) includes, for example, ethylene, propylene, a C4-30 (preferably 4-12, and more preferably 4-10) α-olefin, or a C4-30 (preferably 4-18, and more preferably 4-8) diene.

The α-olefin includes, for example, 1-butene, 4-methyl-1-pentene, 1-pentene, 1-octene, 1-decene, 1-dodecene, or the like.

The diene includes, for example, butadiene, isoprene, cyclopentadiene, 1,11-dodecadiene, or the like.

Among the olefins, ethylene, propylene, a C4-12 α-olefin, butadiene, and isoprene are preferred, ethylene, propylene, a C4-10 α-olefin, and butadiene are more preferred, ethylene, propylene, and butadiene are especially preferred.

Mn of the polyolefin (b10) that has a polyolefin having two modifiable terminals as a main component is preferably 800-20,000, more preferably 1,000-10,000, and especially preferably 1,200-6,000. If Mn is in the range, the antistatic property becomes much better.

The amount of the double bond in (b10) is preferably 1-40, more preferably 2-30, and especially preferably 4-20 relative to a carbon number of 1,000. If the amount of the double bond is in the range, the antistatic property becomes much better.

The average number of the double bond relative to 1 molecule is preferably 1.1-5.0, more preferably 1.3-3.0, especially preferably 1.5-2.5, and most preferably 1.8-2.2. If the average number of the double bond is in the range, a repeated structure can be easily adopted, and the antistatic property becomes much better.

Among the low molecular weight polyolefins obtained through the thermal degradation method, a low molecular weight polyolefin having a Mn in the range of 800-6,000, and having an average number of terminal double bond of 1.5-2 relative to 1 molecule can be easily obtained [Katsuhide Murada, Tadahiko Makino, Journal of the Chemical Society of Japan, Page 192 (1975)].

(b100) can be obtained in the same way as that for (b10), Mn of (3100) is generally 2,000-50,000, preferably 2,500-30, 000, and more preferably 3,000-20,000.

(b100) has 0.3-20, preferably 0.5-15, and more preferably 0.7-10 double bonds relative to a carbon number of 1,000. In view of the ease of the modification, a preferably low molecular weight polyolefin (especially a polyethylene and/or polypropylene having a Mn of 2,000-20,000) obtained through a thermal degradation method is preferred.

Among the low molecular weight polyolefins obtained through the thermal degradation method, a polyolefin having a Mn in the range of 5,000-30,000, and having an average number of terminal double bond of 1-1.5 relative to 1 molecule.

In addition, (b10) and (b100) are generally obtained as a mixture of the low molecular weight polyolefins, the mixture can be used directly, or used after purification. In view of the production cost, the mixture is preferably used.

Hereinafter, (b11)-(b14) having a carbonyl group, a hydroxyl group, an amino group, or an isocyanato group at two terminals of the polyolefin (b10) are described, and (b15)-(b18) having a carbonyl group, a hydroxyl group, an amino group, or an isocyanato group at one terminal of the polyolefin (b100) can be similarly obtained as described for (b11)-(b14) by replacing (b10) with (b100).

The polyolefin (b11) having a carbonyl group at two terminals of the polymer may be, for example, a polyolefin (b11-1) having a structure obtained by modifying the terminals of (b10) with a α,β-unsaturated carboxylic acid (anhydride) (which refers to a α,β-carboxylic acid, or a C1-4 alkyl ester or anhydride thereof; the same below); (b11-2) having a structure obtained through secondary modification of (b11-1) with a lactam or an aminocarboxylic acid; a polyolefin (b11-3) having a structure obtained by modifying (b10) through oxidization or hydroformylation; a polyolefin (b11-4) having a structure obtained through secondary modification of (b11-3) with a lactam or an aminocarboxylic acid, or a mixture of two or more thereof.

(b11-1) can be obtained by modifying (b10) with a α,β-unsaturated carboxylic acid (anhydride).

The α,β-unsaturated carboxylic acid (anhydride) for modification may be a monocarboxylic acid, a dicarboxylic acid, an alkyl(C1-4) ester thereof or an anhydride thereof, for example, (meth)acrylic acid (which refers to acrylic acid or methacrylic acid; the same below), methyl (meth)acrylate, butyl (meth)acrylate, maleic acid (anhydride), dimethyl maleate, fumaric acid, itaconic acid (anhydride), diethyl itaconate, citraconic acid (anhydride) or the like.

Among the α,β-unsaturated carboxylic acids (anhydrides), a dicarboxylic acid, and an alkyl ester and an anhydride thereof are preferred, maleic acid (anhydride) and fumaric acid are more preferred, and maleic acid (anhydride) are especially preferred.

Based on the weight of the polyolefin (b10), the content of the α,β-unsaturated carboxylic acid (anhydride) for modification is preferably 0.5-40%, more preferably 1-30%, and especially preferably 2-20%. If the content of the α,β-unsaturated carboxylic acid (anhydride) is in the range, a repeated structure can be easily adopted, and the antistatic property becomes much better.

The modification with the α,β-unsaturated carboxylic acid (anhydride) can be carried out through various methods, for example, an α,β-unsaturated carboxylic acid (anhydride) is added under heat to a terminal double bond of (b10) (ene reaction) by a solvent method or a melt method. The temperature at which the α,β-unsaturated carboxylic acid (anhydride) is reacted with the polyolefin (b10) is generally 170-230° C.

(b11-2) can be obtained through secondary modification of polyolefin (b11-1) with a lactam or an aminocarboxylic acid.

Lactam for secondary modification may be a C6-12 (preferably 6-8, and more preferably 6) lactam or the like, for example, caprolactam, enantholactam, laurolactam, undecanolactam, or the like.

In addition, the aminocarboxylic acid may be a C2-12 (preferably 4-12, and more preferably 6-12) aminocarboxylic acid or the like, for example, amino acid (e.g. glycine, alanine, valine, leucine, isoleucine, phenylalanine, or the like), ω-aminocaproic acid, ω-aminoenanthic acid, ω-aminocaprylic acid, ω-aminopergonic acid, ω-aminocapric acid, 11-aminoundecanoic acid, 12-aminododecanoic acid, or the like.

Among the aminocarboxylic acids, caprolactam, laurolactam, glycine, leucine, ω-aminocaprylic acid, 11-aminoundecanoic acid, and 12-aminododecanoic acid are preferred, caprolactam, laurolactam, ω-aminocaprylic acid, 11-aminoundecanoic acid, and 12-aminododecanoic acid are more preferred, caprolactam and 12-aminododecanoic acid are especially preferred.

Relative to 1 carboxylic group in the α,β-unsaturated carboxylic acid (anhydride), the amount of the lactam or the aminocarboxylic acid for secondary modification is preferably 0.1-50, more preferably 0.3-20, especially preferably 0.5-10, and most preferably 1-2. If the amount is in the range, a repeated structure can be easily adopted, and the antistatic property becomes much better.

The polyolefin (b11-3) can be obtained by introducing a carbonyl group into (b10) through oxidation with oxygen and/or ozone or through hydroformylation by an oxo process.

The introduction of the carbonyl group through oxidation may be carried out by using a known method, for example, the method described in the specification of U.S. Pat. No. 3,692,877. The introduction of the carbonyl group through hydroformylation may be carried out by using a known method, for example, the method described in Macromolecules, Vol. 31, Page 5943.

(b11-4) can be obtained through secondary modification of (b11-3) with a lactam or an aminocarboxylic acid.

The lactam, aminocarboxylic acid, and a preferred range thereof may be the same as those used in preparation of (b11-2). The contents of the lactam and the aminocarboxylic acid are also the same as above.

In view of the thermal resistance and the reactivity with the hydrophilic polymer (a), Mn of (b11) is preferably 800-25,000, more preferably 1,000-20,000, and especially preferably 2,500-10,000.

Moreover, in view of the reactivity with the hydrophilic polymer (a), an acid value of (b11) is preferably 4-280 (unit: mgKOH/g; and only a numerical value is described below), more preferably 4-100, and especially preferably 5-50.

The polyolefin (b12), having a hydroxyl group at two terminals of the polymer, may be the polyolefins having a hydroxyl group obtained by modifying the polyolefin (b11) that has a carbonyl group at two terminals of the polymer with a hydroxylamine, or a mixture of two or more thereof.

The hydroxylamine useful for modification may include a C2-10 hydroxylamine, for example, 2-aminoethanol, 3-aminopropanol, 1-amino-2-propanol, 4-aminobutanol, 5-aminopentanol, 6-aminohexanol, or 3-aminomethyl-3,5,5-trimethylcyclohexanol.

Among the hydroxylamine, 2-aminoethanol, 3-aminopropanol, 4-aminobutanol, 5-aminopentanol, and 6-aminohexanol are preferred, 2-aminoethanol and 4-aminobutanol are more preferred, and 2-aminoethanol is especially preferred.

Relative to 1 residue of the α,β-unsaturated carboxylic acid (anhydride), the amount of the hydroxylamine for modification is preferably 0.1-2, more preferably 0.3-1.5, especially preferably 0.5-1.2, and most preferably 1. If the amount of the hydroxylamine is in the range, a repeated structure can be easily adopted, and the antistatic property becomes much better.

In view of the thermal resistance and the reactivity with the hydrophilic polymer (a), Mn of (b12) is preferably 800-25,000, more preferably 1,000-20,000, and especially preferably 2,500-10,000.

Furthermore, in view of the reactivity with the hydrophilic polymer (a), a hydroxyl value of (b12) is preferably 4-280 (mgKOH/g; and only a numerical value is described below), more preferably 4-100, and especially preferably 5-50.

The polyolefin (b13) that has an amino group at two terminals of the polymer may be the polyolefins having an amino group obtained by modifying the polyolefin (b11) that has a carbonyl group at two terminals of the polymer with a diamine (Q1), or a mixture of two or more thereof.

The diamine (Q1) for modification may be a C2-12 diamine, for example, ethylenediamine, hexamethylenediamine, heptamethylenediamine, octamethylenediamine, decamethylenediamine, or the like.

Among the diamine, ethylenediamine, hexamethylenediamine, heptamethylenediamine, and octamethylenediamine are preferred, ethylenediamine and hexamethylenediamine are more preferred, and ethylenediamine is especially preferred.

Relative to 1 residue of the α,β-unsaturated carboxylic acid (anhydride), the amount of the diamine for modification is preferably 0.1-2, more preferably 0.3-1.5, more preferably 0.5-1.2, and especially preferably 1. If the amount of the diamine is in the range, a repeated structure can be easily adopted, and the antistatic property becomes much better.

Moreover, in practical preparation, in order to prevent polyamidation (polyimidation), the amount of the diamine used is preferably 2-1,000, more preferably 5-800, and especially preferably 10-500, relative to 1 residue of the α,β-unsaturated carboxylic acid (anhydride), and the un-reacted remaining diamine is removed under a reduced pressure (generally at 120° C.-230° C.).

In view of the thermal resistance and the reactivity with the hydrophilic polymer (a), Mn of (b13) is preferably 800-25,000, more preferably 1,000-20,000, and especially preferably 2,500-10,000.

In addition, in view of the reactivity with the hydrophilic polymer (a), an amine value of (b13) is preferably 4-280 (unit: mgKOH/g; only a numerical value is described below), more preferably 4-100, and especially preferably 5-50.

The polyolefin (b14) that has an isocyanato group at two terminals may be the polyolefins having an isocyanato group obtained by modifying (b12) with poly(2-3 or more)isocyanate (referred to as PI hereinafter), or a mixture of two or more thereof PI includes a C (excluding C in a NCO group, the same below) 6-20 aromatic PI, a C2-18 aliphatic PI, a C4-15 alicyclic PI, a C8-15 araliphatic PI, and a modified product and a mixture of two or more thereof.

Specific examples of the aromatic PI may include, for example, 1,3-phenylene diisocyanate and/or 1,4-phenylene diisocyanate (diisocyanate is referred to as DI hereinafter), 2,4-tolylene DI and/or 2,6-tolylene DI (tolylene diisocyanate, TDI), crude TDI, 2,4'-diphenylmethane DI and/or 4,4'-diphenylmethane DI (MDI), 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene DI, or the like.

Specific examples of the aliphatic PI may include, for example, ethylene DI, tetramethylene DI, hexamethylene DI (HDI), dodecamethylene DI, 2,2,4-trimethylhexamethylene DI, lysine DI, 2,6-diisocyanatomethyl caproate, bis(2-isocyanatoethyl) fumarate, bis(2-isocyanatoethyl) carbonate, 2-isocyanatoethyl-2,6-diisocyanatohexanoate, or the like.

Specific examples of the alicyclic PI may include, for example, isophorone DI (isophorone diisocyanate, IPDI), dicyclohexylmethane-4,4-DI (hydrogenated MDI), cyclohexylene DI, methylcyclohexylene DI (hydrogenated TDI), bis(2-isocyanatoethyl)-4-cyclohexene-1,2-dicarboxylate, 2,5-norbormane DI and/or 2,6-norbormane DI, or the like.

Specific examples of the araliphatic PI may include, for example, m-xylylene DI and/or p-xylylene DI (XDI), α,α,α',α'-tetramethylxylylene diisocyanate (TMXDI), or the like.

In addition, the modified product of the PI may include, for example, a urethane modified product, a urea modified product, a carbodiimide modified product, an uretdione modified product, or the like.

Among the modified products, TDI, MDI, and HDI are preferred, and HDI is more preferred.

The reaction of (b12) and PI may be conducted by using the same method as that for a general urethane reaction.

An equivalent ratio of PI to (b12) (NCO/OH ratio) in forming an isocyanate modified polyolefin is generally 1.8/1-3/1, and preferably 2/1.

In order to facilitate the reaction, a catalyst generally used for polyurethane can be used as desired. The catalyst may include a metal catalyst, for example, a tin catalyst [e.g. dibutyltin dilaurate, stannous octoate, or the like], a lead catalyst [e.g. lead 2-ethylhexanoate, lead octenoate, or the like], or other metal catalysts [e.g. metal naphthenate (e.g. cobalt naphthenate or the like), phenylmercury propionate, or the like]; an amine catalyst, for example, triethylenediamine, a diazabicycloalkene[1,8-d]azabicyclo[5,4,0]undecene-7 [e.g. DBU (manufactured by San-Apro Co., Ltd., registered trademark)] or the like], dialkylaminoalkylamine [e.g. dimethylaminoethylamine, dimethylaminooctylamine, or the like], a carbonate salt and an organic acid salt (formate salt) of a heterocyclic aminoalkylamine [e.g. 2-(1-aziridinyl)ethylamine, 4-(1-piperidinyl)-2-hexylamine, or the like], N-methyl morpholine, N-ethyl morpholine, triethylamine, diethylethanolamine, or dimethylethanolamine; or a combination of two or more thereof.

Based on the total weight of PI and (b12), the amount of the catalyst is generally 3% or below, and preferably 0.001-2%.

In view of the thermal resistance and the reactivity of the hydrophilic polymer (a), Mn of (b14) is preferably 800-25,000, more preferably 1,000-20,000, and especially preferably 2,500-10,000.

In the hydrophobic polymer (b), the polyamide (b2) may include a polyamide obtained by subjecting to an amide forming monomer to ring opening polymerization or polycondensation.

The amide forming monomer may include, for example, a lactam (b21), an aminocarboxylic acid (b22), a diamine (b23), or a dicarboxylic acid (b24).

The lactam (b21) may include a C6-12 lactam, for example, caprolactam, enantholactam, laurolactam, undecanolactam, or the like.

The ring-opening polymer of (b21) may include, for example, nylon 4, nylon 5, nylon 6, nylon 8, or nylon 12.

The aminocarboxylic acid (b22) may include a C6-12 aminocarboxylic acid, for example, ω-aminocaproic acid, ω-aminoenanthic acid, ω-aminocaprylic acid, ω-aminopelargonic acid, ω-aminocapric acid, 11-aminoundecanoic acid, 12-aminododecanoic acid, or a mixture thereof.

The self-polycondensate of (b22) may include, for example, nylon 7 obtained by polycondensing ω-aminoenanthic acid, nylon 11 obtained by polycondensing ω-aminoundecanoic acid, or nylon 12 obtained by obtained by polycondensing 12-aminododecanoic acid.

The diamine (b23) may include a C2-40 diamine, for example, aliphatic diamine, alicyclic diamine, araliphatic diamine, or a mixture thereof.

The aliphatic diamine may include a C2-40 diamine, for example, ethylenediamine, propylenediamine, hexamethylenediamine, decamethylenediamine, 1,12-dodecane diamine, 1,18-octadecane diamine, 1,2-eicosane diamine, or the like.

The alicyclic diamine may include a C5-40 diamine, for example, 1,3-cyclohexyldiamine, 1,4-cyclohexyldiamine, isophorone diamine, 4,4'-diaminocyclohexylmethane, 2,2-bis(4-aminocyclohexyl)propane, or the like.

The araliphatic diamine may include a C7-20 diamine, for example, (p-or m-)xylylene diamine, bis(aminoethyl)benzene, bis(aminopropyl)benezene, bis(aminobutyl)benzene, or the like.

The aromatic diamine may include a C6-40 diamine, for example, p-phenyl diamine, 2,4-toluene diamine, 2,6-toluene diamine, 2,2-bis(4,4'-diaminophenyl)propane, or the like.

The dicarboxylic acid (b24) may include a C2-40 dicarboxylic acid, for example, an aliphatic dicarboxylic acid, an aromatic ring containing dicarboxylic acid, an alicyclic dicarboxylic acid, a derivative thereof [for example, an anhydride, a lower (C1-4) alkyl ester, or a dicarboxylic acid salt [e.g. an alkali metal (e.g. lithium, sodium, potassium) salt, or the like]], or a mixture of two or more thereof.

The aliphatic dicarboxylic acid may include a C2-40 (preferably 4-20, and more preferably 6-12, in view of the antistatic property) dicarboxylic acid, for example, succinic acid, glutaric acid, adipic acid, pimelic acid, suberic acid, azelaic acid, sebacic acid, undecane diacid, dodecane diacid, maleic acid, fumaric acid, itaconic acid, or the like.

The aromatic ring containing dicarboxylic acid may include a C8-40 (preferably 8-16 and more preferably 8-14 in view of the antistatic property) dicarboxylic acid, for example, phthalic acid, isophthalic acid, terephthalic acid, 2,6-naphthalenedicarboxylic acid, 2,7-naphthalenedicarboxylic acid, diphenyl-4,4'-dicarboxylic acid, diphenyloxyethanedicarboxylic acid, toluenedicarboxylic acid, xylylenedicarboxylic acid, and an alkali metal (which is the same as above) salt of 5-sulfoisophthalic acid.

The alicyclic dicarboxylic acid may include a C5-40 (preferably 6-18 and more preferably 8-14 in view of the antistatic property) dicarboxylic acid, for example, cyclopropanedicarboxylic acid, 1,4-cyclohexanedicarboxylic acid, cyclohexenedicarboxylic acid, dicyclohexyl-4,4'-dicarboxylic acid, camphoric acid, or the like. Among the dicarboxylic acids, in view of the antistatic property, an aliphatic dicarboxylic acid and an aromatic ring containing dicarboxylic acid are preferred, and adipic acid, sebacic acid, terephthalic acid, isophthalic acid, and sodium 3-sulfoisophthate are more preferred.

Among the derivative of the dicarboxylic acid, the anhydride may include an anhydride of the above dicarboxylic acids, for example, maleic anhydride, itaconic anhydride, or phthalic anhydride; the lower (C1-4) alkyl ester may include a lower alkyl ester of the above dicarboxylic acids, for example, dimethyl adipate, dimethyl phthalate, dimethyl isophthalate, or dimethyl terephthalate.

The polycondensate of the diamine and the dicarboxylic acid may include, for example, nylon 66, nylon 610, nylon 69, or nylon 612 obtained by polycondensing hexamethylenediamine with adipic acid, sebacic acid, azelaic acid, or dodecane diacid respectively, nylon 46 or MXD6 obtained by polycondensing tetramethylene diamine or xylylene diamine with adipic acid, or the like.

In addition, the copolymerized nylon may include, for example, nylon 6/66 (a copolymer of a nylon salt of adipic acid/hexamethylenediamine and caprolactam), nylon 6/12 (a copolymer of 12-aminododecanoic acid and caprolactam), or the like.

In the amide forming monomer above, in view of the antistatic property, caprolactam, 12-aminododecanoic acid, adipic acid/metaxylylene diamine, and adipic acid/hexamethylenediamine are preferred, and caprolactam is more preferred.

The polyamide (b2) may be prepared by, for example, subjecting the amide forming monomer to ring-opening polymerization or polycondensation, in presence of one or more of the dicarboxylic acid (b24) (C2-40, and preferably 4-20) or the diamine (b23) (C2-40, and preferably 4-20) as a molecular weight adjusting agent.

The C2-40 diamine may include those exemplified as (b23). Among the diamines, in view of the reactivity with other amide forming monomers, an aliphatic diamine is preferred, and hexamethylenediamine and decamethylenediamine are more preferred.

The C2-40 dicarboxylic acid may include those exemplified as (b24). Among the dicarboxylic acids, in view of the reactivity with other amide forming monomers, an aliphatic dicarboxylic acid and an aromatic containing dicarboxylic acid is preferred, and adipic acid, sebacic acid, terephthalic acid, isophthalic acid, and sodium 3-sulfoisophthalate are more preferred.

Based on the total weight of the amide forming monomer and the molecular weight adjusting agent, a lower limit of the content of the molecular weight adjusting agent, in view of the antistatic property of a molded article described below, and an upper limit of the content of the molecular weight adjusting agent, in view of the thermal resistance of the molded article, are preferably 2-80%, and more preferably 4-75%.

In view of the moldability and the preparation of the antistatic agent, Mn of polyamide (b2) is preferably 200-5,000, and more preferably 500-4,000.

In the hydrophobic polymer (b), the polyamide-imide (b3) includes polymers formed by the amide forming monomer and a tribasic or tetrabasic aromatic polycarboxylic acid or an anhydride thereof [referred to as aromatic polycarboxylic acid (anhydride) hereinafter] able to form at least one imide ring with the amide forming monomer (sometimes referred to as amide-imide forming monomer hereinafter), or a mixture thereof. The diamine (b23) and the dicarboxylic acid (b24) may also be used as a molecular weight adjusting agent in polymerization.

The aromatic polycarboxylic acid (anhydride) may include a monocyclic (C9-12) or polycyclic (C3-20) carboxylic acid, for example, a tribasic carboxylic acid [e.g. a monocyclic carboxylic acid (e.g. trimellitic acid or the like), a polycyclic carboxylic acid (1,2,5-naphthalenetricarboxylic acid, 2,6,7-naphthalenetricarboxylic acid, 3,3',4-biphenyltricarboxylic acid, benzophenone-3,3',4-tricarboxylic acid, diphenylsulfone-3,3',4-tricarboxylic acid, diphenylether-3,3',4-tricarboxylic acid, or the like), or an anhydride thereof]; or a tetrabasic carboxylic acid [e.g. a monocyclic carboxylic acid (e.g. pyromellitic acid or the like), a polycyclic carboxylic acid (e.g. biphenyl-2,2',3,3'-tetracarboxylic acid, benzophenone-2,2',3,3'-tetracarboxylic acid, diphenylsulfone-2,2',3,3'-tetracarboxylic acid, diphenylehter-2,2',3,3'-tetracarboxylic acid, or the like), or an anhydride thereof].

The polyamide-imide (b3) may be prepared by, for example, a method similar to that of the polyamide (b2), in which in the presence of one or more of the dicarboxylic acid (C2-40) or the diamine (C2-40) as a molecular weight adjusting agent, the amide-imide forming monomer is subjected to ring-opening polymerization or polycondensation. Among the dicarboxylic acids and the diamines, preferred are those preferred in case of (b2).

Based on the total weight of the amide-imide forming monomer and the molecular weight adjusting agent, a lower limit of the content of the molecular weight adjusting agent, in view of the antistatic property of the molded article described below, and an upper limit of the content of the molecular weight adjusting agent, in view of the thermal resistance of the molded article, are preferably 2-80%, and more preferably 4-75%.

In view of the moldability and the preparation of the antistatic agent, Mn of (b3) is preferably 200-5,000, and more preferably 500-4,000.

In the hydrophobic polymer (b), the polyester (b4) may include a polyester obtained by subjecting an ester forming monomer to a routine method of ring-opening polymerization, polycondensation, or transesterification.

The ester forming monomer may include, for example, a lactone, a hydroxycarboxylic acid, a combination of the diol (a0) and the dicarboxylic acid (b24), or a mixture thereof.

The lactone may include a C4-20 lactone, for example, γ-butyrolactone, γ-valerolactone, ε-caprolactone, γ-heptalactone, γ-caprylolactone, γ-decanolactone, enantholactone, laurolactone, undecanolactone or eicosanolactone.

The hydroxycarboxylic acid may include a C2-20 hydroxycarboxylic acid, for example, hydroxyacetic acid, lactic acid, ω-hydroxycaproic acid, ω-hydroxyenanthic acid, ω-hydroxycaprylic acid, ω-hydroxypergonic acid, ω-hydroxycapric acid, 11-hydroxyundecanoic acid, 12-hydroxydodecanoic acid, 20-hydroxyeicosanoic acid, tropic acid, or benzilic acid.

The polyester (b4) may be prepared by, for example, subjecting the ester forming monomer to a routine method of ring-opening polymerization, polycondensation, or transesterification in the presence of one or more of the diol (a0) and the dicarboxylic acid (b24) as a molecular weight adjusting agent.

Mn of the hydrophobic polymer (b) is preferably 200-25,000, more preferably 500-20,000, and especially preferably 1,000-15,000.

[Block Polymer]

The block polymer in the antistatic agent (A) of the present invention has a structure formed by alternatively bonding a block of the hydrophilic polymer (a) and a block of the hydrophobic polymer (b) with at least a bond selected from the group consisting of an ester bond, an amide bond, an ether bond, a urethane bond, a urea bond and an imide bond.

In view of the antistatic property and the moldability of an antistatic resin composition described below, the block of the hydrophilic polymer (a) accounts for preferably 20-80%, and more preferably 30-70% of the weight of the block polymer.

For the bonding between the blocks of the hydrophilic polymer (a) and the hydrophobic polymer (b), the ester bond, the amide bond, and the imide bond are formed, for example, by reacting the polyether (a1) [(a11) or (a12)] with the hydrophobic polymer (b) [(b11) or (b15)], and the ether bond is formed by, for example, reacting the epoxy modified product obtained through a reaction of epihalohydrin and the polyether diol (a11) with the polyolefin (b12), which has a hydroxyl group at two terminals of the polymer.

In addition, the urethane bond is formed by, for example, reacting the polyether diol (a11) with the polyolefin (b14) which has an isocyanato group at two terminals, and the urea bond is formed by, for example, reacting the polyether diamine (a12) with the polyolefin (b14) which has an isocyanato group at two terminals.

The structure of the block polymer formed by alternatively bonding the block of the hydrophilic polymer (a) and the block of the hydrophobic polymer (b) is of an (a)-(b) type, an (a)-(b)-(a) type, a (b)-(a)-(b) type, or an (a-b)$_n$ type (n is an integer of 2 or above). In view of the antistatic property, the structure of the block polymer is preferably of the (a-b)$_n$ type. In addition, in view of the antistatic property and the mechanical property of a molded article, an average number (Nn) of the repeated structure unit (a-b)$_n$ is preferably 2-50, more preferably 2.3-30, especially preferably 2.7-20, and most preferably 3-10. Nn can be calculated according to Mn of the block polymer and $^1$H-nuclear magnetic resonance ($^1$H-NMR) analysis.

In view of the melt viscosity, Mn of the block polymer is preferably 2,000-100,000, more preferably 5,000-60,000, and especially preferably 10,000-40,000.

[Thermoplastic Resin (B)]

The thermoplastic resin (B) may include, for example, a polyphenylene ether (PPE) resin (B1); a vinyl resin [e.g. a polyolefin resin (B2) [for example, polypropylene (PP), polyethylene (PE), ethylene-vinyl acetate (EVA) copolymer resin, or ethylene-ethyl acrylate copolymer resin], a poly(meth)acrylic resin (B3) [for example, polymethyl methacrylate], a polystyrene resin (B4) [a copolymer having a vinyl containing aromatic hydrocarbon alone, or a vinyl containing aromatic hydrocarbon and at least one selected from the group consisting of (meth)acrylate, (meth)acrylonitrile and butadiene as a structure unit, for example, polystyrene, high impact polystyrene (HIPS), styrene-acrylonitrile copolymer (AN resin), acrylonitrile-butadiene-styrene copolymer (ABS resin), methyl methacrylate-butadiene-styrene copolymer (MBS resin), or styrene-methyl methacrylate copolymer (MS resin)], or the like; a polyester resin (B5) [for example, polyethylene terephthalate, polybutylene terephthalate, polycyclohexanedimethylene terephthalate, polybutylene adipate, or polyethylene adipate]; a polyamide resin (B6) [for example, nylon 66, nylon 69, nylon 612, nylon 6, nylon 11, nylon 12, nylon 46, nylon 6/66, or nylon 6/12]; a polycarbonate resin (B7) [for example, polycarbonate (PC), or PC/ABS alloy resin]; a polyacetal resin (B8), or a mixture of two or more thereof.

Among the thermoplastic resins, in view of the mechanical property of the molded article described below and the dispersivity of the antistatic agent of the present invention in the thermoplastic resin (B), (B1), (B2), (B3), (B4), and (B7) are preferred, (B2), (B4), and (B7) are more preferred.

The polyphenylene ether resin (B1) may include, for example, poly(1,4-phenylene)ether, poly(2,6-dimethyl-1,4-phenylene)ether, poly(2,6-diethyl-1,4-phenylene)ether, poly (2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene) ether, poly(2,6-dimethoxy-1,4-phenylene)ether, poly(2,6-dichloromethyl-1,4-phenylene)ether, poly(2,6-dibromo-1,4-phenylene)ether, poly(2,6-diphenyl-1,4-phenylene)ether, poly(2,6-dichloro-1,4-phenylene)ether, poly(2,6-dibenzyl-1,4-phenylene)ether, or poly(2,5-dimethyl-1,4-phenylene) ether.

In addition, those modified polyphenylene ether obtained by grafting a monomer of styrene and/or a derivative thereof onto (B1) are also covered by (B1).

The vinyl resin [(B2)-(B4)] may include those obtained by (co)polymerizing the following vinyl monomers by using various polymerization methods (e.g. free radical polymerization, polymerization with Ziegler catalyst, polymerization with metallocene catalyst, or the like).

The vinyl monomer may include, for example, an unsaturated hydrocarbon (e.g. aliphatic hydrocarbon, aromatic ring containing hydrocarbon, alicyclic hydrocarbon, or the like), acrylic monomer, other unsaturated monocarboxylic acids or a derivative thereof, other unsaturated dicarboxylic acids or a derivative thereof, a carboxylic acid ester of an unsaturated alcohol, an alkyl ether of an unsaturated alcohol, a halogen containing vinyl monomer, or a combination (random and/or block) of two or more thereof.

The aliphatic hydrocarbon may include, for example, a C2-30 olefin [e.g. ethylene, propylene, a C4-30 α-olefin (e.g. 1-butene, 4-methyl-1-pentene, 1-pentene, 1-octene, 1-decene, 1-dodecene, or the like), or the like], a C4-30 diene [alkadiene (e.g. butadiene, isoprene, or the like), a cycloalkadiene (cyclopentadiene or the like), or the like].

The aromatic ring containing hydrocarbon may include, for example, styrene or a derivative thereof, which have 8 to 30 carbon atoms, for example, an o-alkyl(C1-10)styrene, a m-alkyl(C1-10)styrene or a p-alkyl(C1-10)styrene (e.g. vinyl toluene or the like), an α-alkyl(C1-10)styrene (e.g. α-methylstyrene or the like), or a halostyrene (e.g. chlorostyrene or the like).

The acrylic monomer may include a C3-30 acrylic monomer, for example, (meth)acrylic acid or a derivative thereof.

The derivative of (meth)acrylic acid may include, for example, an alkyl(C1-20) (meth)acrylate [e.g. methyl (meth) acrylate, ethyl (meth)acrylate, butyl (meth)acrylate, or the like], a monoalkyl(C1-4)aminoalkyl(C2-4) (meth)acrylate or a dialkyl(C1-4)aminoalkyl(C2-4) (meth)acrylate [e.g. methylaminoethyl (meth)acrylate, dimethylaminoethyl (meth)acrylate, or the like], (methyl)acrylonitrile, or (meth) acrylamide.

Other unsaturated monocarboxylic acids and dicarboxylic acids may include a C2-30 (preferably 3-20, and more preferably 4-15) unsaturated mono carboxylic acid or dicarboxylic acid, for example, crotonic acid, maleic acid, fumaric acid, itaconic acid, or the like, and the derivative thereof may include a C5-30 derivative, for example, a monoalkyl(C1-20) ester or a dialkyl(C1-20) ester, an anhydride (maleic anhydride or the like), an acid imide (e.g. maleic imide or the like), or the like.

The carboxylic acid ester of an unsaturated alcohol may include, for example, a carboxylic acid (C2-4, for example, acetic acid or propionic acid) ester of an unsaturated alcohol [C2-6, for example, vinyl alcohol or (meth)allyl alcohol] (e.g. vinyl acetate or the like).

The alkyl ether of an unsaturated alcohol may include, for example, an alkyl(C1-20) ether of the above unsaturated alcohols (e.g. methyl vinyl ether, ethyl vinyl ether, or the like). The halogen containing vinyl monomer may include a C2-12 vinyl monomer, for example, vinyl chloride, vinylidene chloride, and chloroprene.

The polyolefin resin (B2) may include, for example, polypropylene, polyethylene, a propylene-ethylene copolymer [copolymerization ratio (weight ratio)=0.1/99.9-99.9/0.1], a copolymer (random and/or block addition) of propylene and/or ethylene with one or more of other α-olefins (C4-12) [copolymerization ratio (weight ratio)=99/1-5/95], ethylene/vinyl acetate (EVA) copolymer [copolymerization ratio (weight ratio)=95/5-60/40], or ethylene/ethyl acrylate (EEA) copolymer [copolymerization ratio (weight ratio)=95/5-60/40].

Among the polyolefin resins, in view of imparting the antistatic property, polypropylene, polyethylene, the propylene-ethylene copolymer, and the copolymer of propylene and/or ethylene with one or more of C4-12 α-olefins [copolymerization ratio (weight ratio)=90/10-10/90, random and/or block addition] are preferred.

In view of the physical properties of the resin, and for imparting the antistatic property, a melt flow rate (referred to as MFR hereinafter) of (B2) is preferably 0.5-150, and more preferably 1-100. MFR is determined according to JIS K7210 (1994) (the conditions for polypropylene: 230° C., and load: 2.16 kgf; and the conditions for polyethylene: 190° C., and load: 2.16 kgf).

In view of the antistatic property, the crystallinity of (B2) is preferably 0-98%, more preferably 0-80%, and especially preferably 0-70%.

The crystallinity is determined by, for example, X-ray diffraction, infrared spectroscopy, or the like [see "Solid Structure of Polymer-Lecture 2 on Polymer Experiment" (Syogorou Minamisino), Page 42, Kyoritu Press, 1958].

The poly(meth)acrylic resin (B3) includes, for example, a (co)polymer of one or more of the above acrylic monomers [e.g. polymethyl (meth)acrylate, polybutyl (meth)acrylate, or the like], or a copolymer of one or more of the monomers with one or more of the above vinyl monomers which are copolymerizable [in view of the physical properties of the resin, the copolymerization ratio (weight ratio) is preferably 5/95-95/5, and more preferably 50/50-90/10] [excluding the copolymer covered by (B2)].

In view of the physical properties of the resin, MFR of (B3) is preferably 0.5-150, and more preferably 1-100. MFR is determined according to JIS K7210 (1994) [the conditions for poly(meth)acrylic resin: 230° C., and load: 1.2 kgf].

The polystyrene resin (B4) may include, for example, a copolymer having a vinyl containing aromatic hydrocarbon alone or a vinyl containing aromatic hydrocarbon, and at least one selected from the group consisting of (meth)acrylate, (meth)acrylonitrile and butadiene as a structure unit.

The vinyl containing aromatic hydrocarbon may include styrene or a derivative thereof which have 8 to 30 carbon atoms, for example, an o-alkyl(C1-10)styrene, a m-alkyl(C1-10)styrene or a p-alkyl(C1-10)styrene (e.g. vinyl toluene or the like), an α-alkyl(C1-10)styrene (e.g. α-methylstyrene or the like) or a halostyrene (e.g. chlorostyrene or the like).

Specific examples of (B4) may include, for example, polystyrene, polyvinyl toluene, styrene-acrylonitrile copolymer (AS resin) [copolymerization ratio (weight ratio)=70/30-80/20)], styrene-methyl methacrylate copolymer (MS resin) [copolymerization ratio (weight ratio)=60/40-90/10], styrene-butadiene copolymer [copolymerization ratio (weight ratio) =60/40-95/5], acrylonitrile-butadiene-styrene copolymer (ABS resin) [copolymerization ratio (weight ratio)=(20-30)/(5-40)/(40-70)], methyl methacrylate-butadiene-styrene copolymer (MBS resin) [copolymerization ratio (weight ratio)=(20-30)/(5-40)/(40-70)], or the like.

In view of the physical properties of the resin, and the antistatic property, MFR of (B4) is preferably 0.5-150, and more preferably 1-100. MFR is determined according to JIS K7210 (1994) (the conditions for polystyrene resin: 230° C., and load: 1.2 kgf).

The polyester resin (B5) may include, for example, an aromatic ring containing polyester (e.g. polyethylene terephthalate, polybutylene terephthalate, polycyclohexanedimethylene terephthalate, or the like) or an aliphatic polyester (e.g. polybutylene adipate, polyethylene adipate, poly-ε-caprolactone, or the like).

In view of the physical properties of the resin, and the antistatic property, the intrinsic viscosity [η] of (B5) is preferably 0.1-4, more preferably 0.2-3.5, and especially preferably 0.3-3. [η] is obtained by determining a 0.5 weight percent (wt %) of the polymer in o-chlorophenol solution at 25° C. by using a Ubbelohde 1A viscometer.

The polyamide resin (B6) may include, for example, a lactam ring-opening polymer (B61), a dehydration polycondensate (B62) of a diamine and a dicarboxylic acid, a self polycondensate (B63) of an aminocarboxylic acid, a copolymer nylon in which two or more monomer units exist in the polymer (polycondensate), or the like.

Lactam of (B61) may include the lactam exemplified as (b21), and (B61) may include, for example, nylon 4, nylon 5, nylon 6, nylon 8, nylon 12, or the like. The diamine and dicarboxylic acid of (B62) may include those exemplified as (b23) and (b24), and (B62) may include, for example, nylon 66 obtained through polycondensation of hexamethylene diamine and adipic acid, nylon 610 obtained through polycondensation of hexamethylenediamine and sebacic acid, or the like.

The aminocarboxylic acid of (B63) may include those exemplified as (b22), and (B63) may include, for example, nylon 7 obtained through polycondensation of aminoenanthic acid, nylon 11 obtained through polycondensation of ω-aminoundecanoic acid, nylon 12 obtained through polycondensation of 12-aminododecanoic acid, or the like.

In preparation of (B6), a molecular weight adjusting agent may be used, and the molecular weight adjusting agent may include the diamine and/or dicarboxylic acid exemplified as (b23) and (b24).

Among the dicarboxylic acids as the molecular weight adjusting agent, an aliphatic dicarboxylic acid, an aromatic dicarboxylic acid, and an alkali metal 3-sulfoisophthalate are preferred, and adipic acid, sebacic acid, terephthalic acid, isophthalic acid, and sodium 3-sulfoisophthalic acid are more preferred. In addition, among the diamine as the molecular weight adjusting agent, hexamethylenediamine, and decamethylenediamine are preferred.

In view of the physical properties of the resin and the antistatic property, MFR of (B6) is preferably 0.5-150, and more preferably 1-100. MFR is determined according to JIS K7210 (1994) (conditions for polyamide resin: 230° C., and load 0.325 kgf).

The polycarbonate resin (B7) may include a bisphenol compound (C 12-20, for example, bisphenol A, bisphenol F, bisphenol S, or 4,4'-dihydroxydiphenyl-2,2-butane) or a dihydroxybiphenyl polycarbonate, for example, a condensate of the above bisphenol compounds with phosgene or a carbonate diester. Among the bisphenol compounds, in view of the dispersivity of the block polymer antistatic agent (A), bisphenol A is preferred.

In view of the physical properties of the resin and the antistatic property, MFR of (B7) is preferably 0.5-150, and more preferably 1-100. MFR is determined according to JIS K7210 (1994) (conditions for polycarbonate resin: 280° C., and load 2.16 kgf).

The polyacetal resin (B8) may include, for example, a homopolymer of formaldehyde or trioxane (polyoxymethylene homopolymer), or a copolymer of formaldehyde or trioxane with a cyclic ether [the above AOs (e.g. EO, PO, dioxolane, or the like) or the like] (e.g. a polyformaldehyde-polyoxyethylene copolymer [e.g. a block copolymer of polyformaldehyde-polyoxyethylene (weight ratio)=90/10-99/1]).

In view of the physical properties of the resin and the antistatic property, MFR of (B8) is preferably 0.5-150, and more preferably 1-100. MFR is determined according to JIS K7210 (1994) (conditions for polyacetal resin: 190° C., and load 2.16 kgf).

In view of the physical properties of the resin and the antistatic property, the intrinsic viscosity [η] of (B8) is preferably 0.1-4, more preferably 0.2-3.5, and especially preferably 0.3-3.

[Antistatic Resin Composition (X)]

The antistatic resin composition (X) of the present invention contains the antistatic agent (A) and the thermoplastic resin (B), in which a melt viscosity ratio of the thermoplastic resin (B) to the antistatic agent (A) at 220° C. is, in view of the antistatic property, 0.5-5, preferably 0.7-3.5, more preferably 0.8-2.5, and especially preferably 0.9-1.5. An absolute value of a difference between solubility parameters (SPs) of the thermoplastic resin (B) and the antistatic agent (A) is, in view of the antistatic property and the mechanical property, 1.0-3.0, preferably 1.1-2.5, and more preferably 1.2-2.0.

In a specific combination of the thermoplastic resin (B) and the antistatic agent (A) forming the antistatic resin composition (X), the melt viscosity ratio must meet the above range, while the melt viscosity of the thermoplastic resin (B) or the melt viscosity of the antistatic agent (A) can be any value and is not particularly limited.

In addition, the same case is applicable to SP. In a specific combination of the thermoplastic resin (B) and the antistatic agent (A) forming the antistatic resin composition (X), the absolute value of the difference between the SPs must meet the above range, while the SP of the antistatic agent (A) or the SP of the thermoplastic resin (B) can be any value and is not particularly limited.

The melt viscosity ratio of the thermoplastic resin (B) to the antistatic agent (A) at 220° C. can be set in the above range by selecting a combination of the thermoplastic resin (B) and the antistatic agent (A), so as to prepare an antistatic resin composition (X) with an excellent antistatic property.

The absolute value of the difference between the SPs of the antistatic agent (A) and the thermoplastic resin (B) can be set in the above range by selecting a combination of the thermoplastic resin (B) and the antistatic agent (A), so as to prepare an antistatic resin composition (X) with an excellent antistatic property.

In view of the antistatic property and the mechanical property, the weight ratio of the antistatic agent (A) and the thermoplastic resin (B) in the antistatic resin composition (X) is preferably 0.5/99.5-10/90, more preferably 1/99-7/93, and especially preferably 3/97-5/95.

In the antistatic resin composition (X) of the present invention, in addition to the antistatic agent (A), one or two or more additives (C) selected from the group consisting of an antistatic promoter (C1), a compatibilizer (C2), a flame retardant (C3), and other additives (C4) for a resin can be contained as desired without compromising the effect of the present invention.

The antistatic promoter (C1) includes a mixture of one or two or more selected from the group consisting of an alkali metal salt or alkaline earth metal salt (C11), a surfactant (C12), and/or an ionic liquid (C13).

(C11) may be, for example, an organic acid (a C1-7 monocarboxylic acid or dicarboxylic acid, for example, formic acid, acetic acid, propionic acid, oxalic acid, or succinic acid; a C1-7 sulfonic acid, for example, methanesulfonic acid, or p-toluenesulfonic acid; or thiocyanic acid) salt, or an inorganic acid (a halogen acid, for example, hydrochloric acid, or hydrobromic acid; perchloric acid; sulfuric acid; nitric acid; or phosphoric acid) salt of an alkali metal (e.g. lithium, sodium, potassium, or the like) and/or an alkaline earth metal (e.g. magnesium, calcium, or the like).

In order to prevent the eduction on the surface of the resin and thus to provide a resin molded article having a good appearance, the content of (C11) is preferably 0.001-3%, more preferably 0.01-2.5%, especially preferably 0.1-2%, and most preferably 0.15-1% based on the total weight of the antistatic agent (A) and the thermoplastic resin (B).

The method for adding (C11) is not particularly limited, and in view of the ease for effectively dispersing (C11) in the composition, (C11) is preferably dispersed in the antistatic agent (A) in advance.

In addition, in case that (C11) is dispersed in the antistatic agent (A), especially preferred is that (C11) is added and dispersed in advance during the preparation (polymerization) of the antistatic agent (A). The time at which (C11) is added during the preparation of the antistatic agent (A) is not particularly limited, and (C11) may be added at any time before, during, or after polymerization.

The surfactant (C12) may include, for example, a non-ionic, an anionic, a cationic, an amphoteric surfactant, or a mixture thereof. The non-ionic surfactant (C121) may include, for example, a non-ionic surfactant added with EO [for example, an EO adduct of a higher alcohol (C8-18, the same below), a higher fatty acid (C8-24, the same below), or a higher alkylamine (C8-24) (having a molecular weight of 158 or above, and an Mn of 200,000 or below); a higher fatty acid ester of a polyalkylene glycol as an EO adduct of a glycol (having a molecular weight of 150 or above and an Mn of 6,000 or below); an EO adduct of a higher fatty acid ester of a polyhydric alcohol (a C2-18 dihydric-octahydric or higher polyhydric alcohol, for example, EG, PG, glycerin, pentaerythritol, and sorbitan) (having a molecular weight of 250 or above and an Mn of 30,000 or below); an EO adduct of a higher fatty acid amide (having a molecular weight of 200 or above and an Mn of 30,000 or below); or an EO adduct of an alkyl(C3-60) ether of a polyhydric alcohol (the above polyhydric alcohols) (having a molecular weight of 120 or above and an Mn of 30,000 or below)], or a polyhydric alcohol (the above polyhydric alcohols) (C3-60) type non-ionic surfactant [for example, a fatty acid (C3-60) ester of a polyhydric alcohol, an alkyl (C3-60) ether of a polyhydric alcohol, or a fatty acid (C3-60) alkanolamide].

The anionic surfactant (C122) is represented by a general Formula (1) below:

$$R—X^-.Z^+ \quad (1)$$

in which R represents a C8-30 (preferably C10-24, and more preferably C12-21) mono-valent hydrocarbyl group.

R may include, for example, an alkyl, an alkenyl, an alkylaryl, or an arylalkyl.

The alkyl may include octyl, decyl, dodecyl, pentadecyl, octadecyl, or the like.

The alkenyl may include octenyl, decenyl, dodecenyl, pentadecenyl, octadecenyl, or the like.

The alkylaryl may include ethylphenyl, pentylphenyl, nonylphenyl, decylphenyl, dodecylphenyl, pentadecylphenyl, octadecylphenyl, or the like.

The arylalkyl may include phenylethyl, phenylpentyl, phenyldecyl, phenylnonyl, phenyldodecyl, phenylpentadecyl, phenyloctadecyl, or the like.

Among R, in view of the antistatic property, an alkyl and an alkylaryl are preferred, a C12-21 alkylaryl is more preferred, and dodecylphenyl and pentadecylphenyl are especially preferred.

In the formula, $X^-$ represents an anion obtained by removing a proton from at least one selected from the group consisting of a sulfonic group, a sulfinic group, a sulfate group, a carboxyl group, a phosphate group, and a phosphite group. Among the groups, in view of the antistatic property, the sulfonic group, the sulfinic group, and the sulfate group are preferred, the sulfonic group and the sulfate group are more preferred, and the sulfonic group is especially preferred.

In the formula, $Z^+$ represents a cation selected from the group consisting of amidinium, pyridinium, pyrazolium, and guanidinium cations, a metal [e.g. an alkali metal (e.g. lithium, sodium, potassium, or the like), an alkaline earth metal (e.g. calcium, magnesium, or thelike), a Group IIB metal (e.g. zinc or the like), or the like] or amine [an alkylamine (e.g. (C1-720), an alkanolamine (e.g. C2-12, for example, monoethanolamine, diethanolamine, or triethanolamine), or the like].

Amidinium cation may include:
(1) Imidazolinium Cation
C5-15, for example, 1,2,3,4-tetramethylimidazolinium, or 1,3-dimethylimidazolinium;
(2) Imidazolium Cation
C5-15, for example, 1,3-dimethylimidazolium, or 1-ethyl-3-methylimidazolium;
(3) Tetrahydropyrimidinium Cation
C6-15, for example, 1,3-dimethyl-1,4,5,6-tetrahydropyrimidinium, or 1,2,3,4-tetramethyl-1,4,5,6-tetrahydropyrimidinium; and
(4) Dihydropyrimidinium Cation
C6-20, for example, 1,3-dimethyl-1,4-dihydropyrimidinium or 1,3-dimethyl-1,6-dihydropyrimidinium [which are described as 1,3-dimethyl-1,4(6)-dihydropyrimidinium, and the same is applied below], or 8-methyl-1,8-diazabicyclo[5,4,0]-7,9(10)-undecadienium.

Pyridinium cations may include a C6-20 pyridinium cation, for example, 3-methyl-1-propylpyridinium or 1-butyl-3,4-dimethylpyridinium.

Pyrazolium cation may include a C5-15 pyrazolium cation, for example, 1,2-dimethylpyrazolium or 1-n-butyl-2-methylpyrazolium.

Guanidinium cation may include:
(1) Guanidinium Cation Having an Imidazolinium Skeleton
C8-15, for example, 2-dimethylamino-1,3,4-trimethylimidazolinium or 2-diethylamino-1,3,4-trimethylimidazolinium;
(2) Guanidinium Cation Having an Imidazolium Skeleton
C8-15, for example, 2-dimethylamino-1,3,4-trimethylimidazolium or 2-diethylamino-1,3,4-trimethylimidazolinum;
(3) Guanidinium cation having a tetrahydropyrimidinium skeleton
C10-20, for example, 2-dimethylamino-1,3,4-trimethyl-1,4,5,6-tetrahydropyrimidinium or 2-diethylamino-1,3-dimethyl-4-ethyl-1,4,5,6-tetrahydropyrimidinium; and
(4) Guanidinium Cation Having a Dihydropyrimidinium Skeleton
C 10-20, for example, 2-dimethylamino-1,3,4-trimethyl-1,4(6)-dihydropyrimidinium or 2-diethylamino-1,3-dimethyl-4-ethyl-1,4(6)-dihydropyrimidinium.

Among the cations, in view of the antistatic property, an amidinium cation is preferred, an imidazolium cation is more preferred, and 1-ethyl-3-methylimidazolium cation is especially preferred.

Among the anionic surfactant (C122), specific example of an sulfonate salt may include an imidazolium alkanesulfonate (e.g. 1-ethyl-3-methylimidazolium salt or 1,3-dimethyl-2-ethylimidazolium salt of dodecanesulfonic acid or pentadecanesulfonic acid, or the like), an imidazolium alkenesulfonate (e.g. 1-ethyl-3-methylimidazolium salt or 1,3-dimethyl-2-ethylimidazolium salt of dodecenesulfonic acid or pentadecenesulfonic acid, or the like), an imidazolium alkylarenesulfonate (1-ethyl-3-methylimidazolium salt or 1,3-dimethyl-2-ethylimidazolium salt of dodecylbenzenesulfonic acid or pentadecylbenzenesulfonic acid, or the like), an imidazolium arylalkanesulfonate (e.g. 1-ethyl-3-methylimidazolium salt or 1,3-dimethyl-2-ethylimidazolium salt of phenyldodecanesulfonic acid or phenylpentadecanesulfonic acid, or the like), or a metal (as described above) salt or an amine salt of the sulfonic acids.

Among the sulfonate salts, in view of the antistatic property and the appearance of a molded article, an imidazolium and metal alkylarene (C8-30) sulfonate are preferred, and 1-ethyl-3-methylimidazolium, 1,3-dimethyl-2-ethylimidazolium and an alkali metal (e.g. sodium or the like) dodecylbenzenesulfonate, and 1-ethyl-3-methylimidazolium, 1,3-dimethyl-2-ethylimidazolium, and an alkali metal (e.g. sodium or the like) pentadecylbenzenesulfonate are more preferred.

The cationic surfactant (C123) may include a quaternary ammonium salt, such as an alkyltrimethylammonium salt.

The amphoteric surfactant (C124) may include, for example, an amino acid type amphoteric surfactant, such as a higher alkylaminopropionate, or the like, a betaine type amphoteric surfactant, such as a higher alkyldimethylbetaine, a higher alkyldihydroxyethyl betaine, or the like.

Salt among the amphoteric surfactants (C124) includes a metal salt, for example, a salt of an alkali metal (e.g. lithium, sodium, potassium, or the like), an alkaline earth metal (e.g. calcium, magnesium, or the like), or a Group IIB metal (e.g. zinc or the like); an ammonium salt; an amine salt [e.g. an alkylamine (C1-720) salt, an alkanolamine (C2-12, for example, monoethanolamine, diethanolamine, or triethanolamine) salt, or the like] or a quaternary ammonium salt.

The surfactant may be used alone or in a combination of two or more.

Based on the total weight of the antistatic agent (A) and the thermoplastic resin (B), the content of the surfactant (C12) is preferably 0.001-5%, more preferably 0.01-3%, and especially preferably 0.1-2.5%.

The method for adding (C12) is not particularly limited, and in order to effectively disperse (C12) in the resin composition, (C12) is preferably dispersed in the antistatic agent (A) in advance. In addition, in case that (C12) is dispersed in the antistatic agent (A), especially preferred is that (C12) is added and dispersed in advance during the preparation (polymerization) of the antistatic agent (A). The time at which (C12) is added during the preparation of the antistatic agent (A) is not particularly limited, and (C12) may be added at any time before, during, or after polymerization.

The ionic liquid (C13) is a compound besides (C12), and is a salt melted at normal temperature which has a melting point below room temperature, and an initial conductivity of 1-200 ms/cm (preferably 10-200 ms/cm), in which at least one of a cation or an anion that forms (C13) is an organic ion, for example, the salt melted at normal temperature described in WO95/15572.

The cation that forms (C13) may include the cation represented by $Z^+$ in general Formula (1) above, that is, the cation selected from the group consisting of amidinium, pyridinium, pyrazolium, and guanidinium cations.

The cation may be used alone, or in combination of two or more. Among the cations, in view of the antistatic property, an amidinium cation is preferred, an imidazolium cation is more preferred, and 1-ethyl-3-methylimidazolium cation is especially preferred.

In (C13), an organic or inorganic acid that forms the anion may include the following acids.

The organic acid may include, for example, a carboxylic acid, a sulfate, sulfonic acid, or a phosphate; and the inorganic acid may include, for example, a superacid (for example, fluoroboric acid, tetrafluoroboric acid, perchloric acid, hexafluorophosphoric acid, hexafluoroantimonic acid, or hexafluoroarsenic acid), phosphoric acid, or boric acid.

The organic and inorganic acids may be used alone or in combination of two or more.

Among the organic and inorganic acids, in view of the antistatic property of (C13), a superacid forming conjugate base which forms the anion of (C13) and has a Hammett acidity function ($-H_0$) of 12-100, an acid of an anion other than the conjugate base of a superacid, or a mixture thereof are preferred.

The anion other than the conjugate base of a superacid may include, for example, a halogen (for example, fluorine, chlorine, and bromine) ion, an alkyl(C1-12)benzenesulfonic acid (for example, p-toluenesulfonic acid or dodecylbenzenesulfonic acid) ion, or a poly(n=1-25)fluoroalkanesulfonic acid (for example, undecafluoropentanesulfonic acid).

The superacid may include those derived from a protonic acid, a combination of a protonic acid and a Lewis acid, or a mixture thereof.

The protonic acid as a superacid may include, for example, bis(trifluoromethylsulfonyl)imic acid, bis(pentafluoroethylsulfonyl)imic acid, tris(trifluoromethylsulfonyl)methane, perchloric acid, fluorosulfonic acid, alkane(C1-30)sulfonic acid [for example, methanesulfonic acid, dodecanesulfonic acid, or the like), poly(n=1-30)fluoroalkane(C1-30)sulfonic acid (for example, trifluoromethanesulfonic acid, pentafluoroethanesulfonic acid, heptafluoropropanesulfonic acid, nonafluorobutanesulfonic acid, undecafluoropentanesulfonic acid, or tridecafluorohexanesulfonic acid)], fluoroboric acid, or tetrafluoroboric acid.

Among the acids, in view of the ease of synthesis, fluoroboric acid, trifluoromethanesulfonic acid, bis(trifluoromethylsulfonyl)imic acid, and bis(pentafluoroethylsulfonyl) imic acid are preferred.

The protonic acid used in combination with a Lewis acid may include, for example, a hydrogen halide (for example, hydrogen fluoride, hydrogen chloride, hydrogen bromide, or hydrogen iodide), perchloric acid, fluorosulfonic acid, methanesulfonic acid, trifluoromethanesulfonic acid, pentafluoroethanesulfonic acid, nonabutanesulfonic acid, undecapentanesulfonic acid, tridecafluorohexanesulfonic acid, or a mixture thereof.

Among the acids, in view of the initial conductivity of (C13), hydrogen fluoride is preferred.

Lewis acid may include, for example, boron trifluoride, phosphorus pentafluoride, antimony pentafluoride, arsenic pentafluoride, tantalum pentafluoride, or a mixture thereof. Among the acids, in view of the initial conductivity of (C13), boron trifluoride and phosphorus pentafluoride is preferred.

The combination of the protonic acid and Lewis acid may be any combination, and the superacid formed by the combination may include, for example, tetrafluoroboric acid, hexafluorophosphoric acid, hexafluorotantalic acid, hexafluoroantimonic acid, hexafluorotantalic sulfonic acid, tetrafluoroboric acid, hexafluorophosphoric acid, chlorotrifluoroboric acid, hexafluoroarsenic acid, or a mixture thereof.

Among the anions, in view of the antistatic property of (C13), a conjugate base of a superacid (a superacid formed by a protonic acid and a superacid formed by a combination of a protonic acid and a Lewis acid) is preferred, and a conjugate base of a superacid formed by a protonic acid and a superacid formed by a protonic acid with boron trifluoride and/or phosphorus pentafluoride are more preferred.

Among the ionic liquids (C13), in view of the antistatic property, an ionic liquid having an amidinium cation is preferred, an ionic liquid having 1-ethyl-3-methylimidazolium cation is more preferred, and 1-ethyl-3-methylimidazolium bis(trifluoromethylsulfonyl)imide is especially preferred.

Based on the total weight of the antistatic agent (A) and the thermoplastic resin (B), the content of (C13) is preferably 0.001-5%, more preferably 0.01-3%, and especially preferably 0.1-2.5%.

The method for adding (C13) is not particularly limited, and in order to effectively disperse (C13) in the resin composition, (C13) is preferably dispersed in the antistatic agent (A) in advance. In addition, in case that (C13) is dispersed in the antistatic agent (A), especially preferred is that (C13) is added and dispersed in advance during the preparation (polymerization) of the antistatic agent (A). The time at which (C13) is added during the preparation of the antistatic agent (A) is not particularly limited, and (C12) may be added at any time before, during, or after polymerization.

The compatibilizer (C2) may be a modified vinyl polymer having at least a functional group (polar group) selected from the group consisting of a carboxyl group, an epoxy group, an amino group, a hydroxyl group, and a polyoxyalkylene, for example, the polymer as described in Japanese Patent Publication No. 1991-258850. Furthermore, for example, the modified vinyl polymer having a sulfonic group, the block polymer having a polyolefin moiety and an aromatic vinyl polymer moiety, or the like as described in Japanese Patent Publication No. 1994-345927 can also be used.

Based on the total weight of the antistatic agent (A) and the thermoplastic resin (B), the content of (C2) is generally 20% or below, and is preferably 0.1-15%, more preferably 1-10%, and especially preferably 1.5-8% in view of the compatibility and the mechanical property of a molded article.

The method for adding (C2) is not particularly limited, and in view of the ease for effectively dispersing or dissolving (C2) in the composition, (C2) is preferably dispersed in the antistatic agent (A) in advance.

In addition, in case that (C2) is dispersed or dissolved in the antistatic agent (A), especially preferred is that (C2) is added in advance during the preparation (polymerization) of the antistatic agent (A). The time at which (C2) is added during the preparation of the antistatic agent (A) is not particularly limited, and (C2) may be added at any time before, during, or after polymerization.

The flame retardant (C3) includes one or two or more flame retardants selected from the group consisting of a halogen containing flame retardant (C31), a nitrogen containing flame retardant (C32), a sulfur containing flame retardant (C33), a silicon containing flame retardant (34), and a phosphorus containing flame retardant (C35).

The halogen containing flame retardant (C31) may include hexachloropentadiene, hexabromodiphenyl, octabromodiphenyl oxide, or the like.

The nitrogen containing flame retardant (C32) may include a salt of a urea compound, a guanidine compound or a triazine compound (e.g. melamine guanamine, or the like), and cyanuric acid or isocyanuric acid, or the like.

The sulfur containing flame retardant (C33) may include a sulfate ester, an organic sulfonic acid, sulfamic acid, an organic sulfamic acid, or a salt, an ester, or an amide thereof, or the like.

The silicon containing flame retardant (C34) may include a polyorganosiloxane or the like.

The phosphorus containing flame retardant (C35) may include a phosphorus containing acid, or an ester (C2-20) thereof, for example, phosphoric acid, a phosphate ester, a halogen containing phosphate ester, phosphorous acid, a phosphonate ester, an ammonium salt of phosphoric acid, or the like.

The flame retardants may be used in combination with a flame retardant promoter [e.g. an anti-dripping agent (for example, polytetrafluoroethylene), a metal oxide (for example, zinc oxide), or the like] as desired.

Among the flame retardants, in view of the flame retardancy and the prevention of environmental pollution caused by, for example, dioxin generated in burning, (C32) is preferred.

Based on the total weight of the antistatic agent (A) and the thermoplastic resin (B), a total content of (C3) is generally 30% or below, and is preferably 0.1-20%, and more preferably 1-10% in view of the flame retardancy and the mechanical property of a molded article.

Other additives (C4) for a resin may include one or two or more additives selected from the group consisting of a pigment, a dye, a nucleating agent, a lubricant, a plasticizer, a mold release agent, an antioxidant, a UV absorbent, and an antimicrobial agent.

Based on the total weight of the antistatic agent (A) and the thermoplastic resin (B), a total content of (C4) is generally 45% or below, and is preferably 0.001-40%, more preferably 0.01-35%, and especially preferably 0.05-30% in view of the effects of the additives and the mechanical property of a molded article.

The antistatic resin composition (X) of the present invention is obtained by melt mixing the antistatic agent (A), the thermoplastic resin (B), and optionally (C).

The melt mixing method is generally a method including mixing pellet or powered ingredients in a suitable mixer, for example, Henschel mixer, and then granulating by melt mixing with an extruder.

The addition sequence of ingredients in melt mixing is not particularly limited, and the methods may include, for example:

(1) melt mixing the antistatic agent (A), the thermoplastic resin (B), and optionally (C) together; and (2) melt mixing the antistatic agent (A) and a portion of the thermoplastic resin (B) in advance, to prepare a resin composition (master batch resin composition) with a high content of antistatic agent, and then melt mixing the remaining thermoplastic resin (B) and optionally (C).

In the master batch resin composition obtained in the method (2), the concentration of the antistatic agent of the present invention is preferably 40-80 wt %, and more preferably 50-70 wt %.

In the methods, the method (2) is referred to as a master batch method, which is preferred considering the efficient dispersion of the antistatic agent (A) in the thermoplastic resin (B).

The molded article of the present invention is obtained by molding the antistatic resin composition (X). The molding method may include, for example, injection molding, compression molding, calendaring molding, slush molding, rotational molding, extrusion molding, blow molding, foam molding, film molding (e.g. cast method, tenter method, inflation method, or the like), or the like, and the antistatic resin composition (X) can be molded by any method according to different objectives.

The molded article has not only excellent permanent antistatic property, mechanical property, and thermal resistance, but also has a good coatability and printability.

The method for coating the molded article may include, but is not limited to, air spray, airless spray, electrostatic spray, impregnation, roller method, or brush coating. The coating may include various coatings, such as polyestermelamine, epoxy-melamine, melamine acrylate, or urethane acrylate resin coating.

The thickness of a coating (post drying) can be properly selected according to different objectives, and is preferably 10-50 μm, and more preferably 15-40 μm in view of the physical properties of the coating.

In addition, the method for printing the molded article may include various printing method, for example, gravure printing, flexographic printing, screen printing, or offset printing. A printing ink may include an ink generally used in printing of a plastic.

EXAMPLES

The present invention is described below with reference to examples, but the present invention is not limited thereto. In addition, parts in the examples represent weight parts, and % represents wt %.

Preparation of Example 1

Preparation of an Acid Modified Polyolefin (b1-1)

In a stainless steel autoclave, 95 parts of a low molecular weight ethylene-propylene random copolymer (having an Mn of 3,500, a density of 0.89 g/cm$^3$, a number of double bond of 7.1 per 1,000 C, and an average number of double bond of 1.8 per 1 molecule, and with the content of polyolefin which has two modifiable terminals being 90%) obtained through thermal degradation [an ethylene-propylene (random addition) copolymer (with the content of ethylene being 2%) having a density of 0.90 g/cm$^3$ and an MFR of 6.0 g/10 min at 23° C. was thermally degraded at 410±0.1° C. under a nitrogen atmosphere], 10 parts of maleic anhydride, and 30 parts of xylene were added, melted at 200° C. under a nitrogen atmosphere (while being sealed), and reacted for 20 hrs at 200° C.

Then, the remaining maleic anhydride and xylene were distilled off for 3 hrs at 200° C. under a reduced pressure, to obtain an acid modified polyolefin (b1-1). The acid value of (b1-1) is 27.2, and Mn is 3,700.

Preparation of Example 2

Preparation of a Secondarily Modified Polyolefin (b1-2)

In a stainless steel autoclave, 88 parts of (b1-1) and 12 parts of 12-aminododecanoic acid were added, melted at 200° C. under a nitrogen atmosphere, and then reacted for 3 hrs at 200° C. under a reduced pressure of 1.3 kPa or below, to obtain a secondary modified polyolefin (b1-2). The acid value of (b1-2) is 24.0 and Mn is 4,200.

Preparation of Example 3

Preparation of a Modified Polyolefin (b1-3) which has a Hydroxyl Group at Two Terminals of the Polymer In a stainless steel autoclave, 95 parts of the acid modified polyolefin (b1-1) and 5 parts of ethanolamine were melted at 180° C. under a nitrogen atmosphere, and then reacted for 2 hrs at 180° C. Thereafter, the remaining ethanolamine was distilled off for 2 hrs at 180° C. under a reduced pressure to obtain a modified polyolefin (b1-3), which has a hydroxyl group at two terminals of the polymer. The hydroxyl value of (b1-3) is 26.0, the amine value is 0.01, and Mn is 3,900.

Preparation of Example 4

Preparation of a Modified Polyolefin (b1-4) which has an Amino Group at Two Terminals of the Polymer In a stainless steel autoclave, 95 parts of the acid modified polyolefin (b1-1) and 40 parts of bis(2-aminoethyl)ether were melted at 200° C. with stirring under a nitrogen atmosphere, and then reacted at 200° C. for 2 hrs. Then, the remaining bis(2-aminoethyl)ether was distilled off for 2 hrs at 200° C. under a reduced pressure to obtain a modified polyolefin (b1-4), which has an amino group at two terminals. The amine value of (b1-4) is 25.5 and Mn is 4,000.

Preparation of Example 5

Preparation of a Polyamide (b2-1) which has a Carboxyl Group at Two Terminals

In a stainless steel autoclave, 173 parts of s-caprolactam, 33.2 parts of terephthalic acid, 0.4 part of an antioxidant [Trade name "Irganox 1010", manufactured by Ciba Specialty Chemicals, tetrakis[methylene-3-(3',5'-di-t-butyl-4'-hydroxyphenyl)propionate]methane, the same below], and 10 parts of water were added, after the autoclave was purged with nitrogen, and then heated and stirred for 4 hrs at 220° C. under a pressure (0.3-0.4 MPa, the same below) while being sealed, to obtain a polyamide (b2-1) which has a carboxyl group at two terminals. Mn of (b2-1) is 1,000, and the acid value is 111.

Preparation of Example 6

Preparation of a Cationic Polymer (a2-1)

In a glass autoclave, 41 parts of N-methyldiethanolamine, 49 parts of adipic acid, and 0.3 part of zirconium acetate were added. Further, after the autoclave was purged with nitrogen, the reactants were heated to 220° C. for 2 hrs and depressurized to 0.13 kPa for 1 hr for polyesterification. After the reaction, a resulting product was cooled to 50° C., which was then dissolved by adding 100 parts of methanol. The solution was stirred while the temperature was kept at 120° C., and 31 parts of dimethyl carbonate was slowly dropped over 3 hrs and aged at 120° C. for 6 hrs. After cooling to room temperature, 110 parts of dioctylphosphoric acid was added and stirred at room temperature for 1 hr. Then, methanol was removed under a reduced pressure to obtain a cationic polymer (a2-1), which has 12 quaternary ammonium groups on average in 1 molecule. The hydroxyl value of (a2-1) is 16.5, the acid value is 0.5, Mn is 6,800, and the volume intrinsic resistance is $1\times10^5$ Ω·cm.

Preparation of Example 7

Preparation of an Anionic Polymer (a3-1)

In a stainless steel autoclave, 67 parts of PEG having an Mn of 300, 49 parts of dimethyl 5-sulfoisophthalate sodium salt and 0.2 part of dibutyltin oxide were added, heated to 190° C. under a reduced pressure of 0.67 kPa, and then subjected to 6 hrs of transesterification, while methanol generated in the reaction was distilled off to obtain an anionic polymer (a3-1), which has 5 basic sodium sulfonate groups on average in 1 molecule. The hydroxyl value of (a3-1) is 29.6, the acid value is 0.4, Mn is 3,500, and the volume intrinsic resistance is $2 \times 10^6$ Ω·cm.

Preparation of Example 8

Preparation of an Antistatic Agent (A-1)

In a stainless steel autoclave, 60.9 parts of the secondarily modified polyolefin (b1-2), 39.1 parts of PEG (a1-1) (having an Mn of 3,000, and a volume intrinsic resistance of $1 \times 10^7$ Ω·cm), 0.3 part of an antioxidant, and 0.5 part of zirconium acetate were added, and polymerized for 4 hrs at 230° C. under a reduced pressure of 0.13 kPa to obtain a viscous polymer. The polymer was taken from a belt as a strand and then pelleted to obtain an antistatic agent (A-1) formed by a block polymer. The melt viscosity of (A-1) is 180 Pa·s, SP is 8.8, and Mn is 30,000. (The average repeated number Nn is 4.2).

Preparation of Example 9

Preparation of an Antistatic Agent (A-2)

An antistatic agent (A-2) formed by a block polymer was obtained in the same way as that in Preparation Example 8, except that the polymerization time in Preparation Example 8 was changed from 4 hrs to 3 hrs. The melt viscosity of (A-2) is 40 Pa·s, SP is 8,8, and Mn is 22,000. (The average repeated number Nn is 3.1).

Preparation of Example 10

Preparation of an Antistatic Agent (A-3)

An antistatic agent (A-3) formed by a block polymer was obtained in the same way as that in the Preparation of Example 8, except that the polymerization time in the Preparation of Example 8 was changed from 4 hrs to 3.5 hrs. The melt viscosity of (A-3) is 110 Pa·s, SP is 8.8, and Mn is 26,000. (The average repeated number Nn is 3.6).

Preparation of Example 11

Preparation of an Antistatic Agent (A-4)

An antistatic agent (A-4) formed by a block polymer was obtained in the same way as that in Preparation Example 8, except that the polymerization time in Preparation Example 8 was changed from 4 hrs to 10 hrs. The melt viscosity of (A-4) is 280 Pa·s, SP is 8.8, and Mn is 41,000. (The average repeated number Nn is 5.7).

Preparation of Example 12

Preparation of an Antistatic Agent (A-5)

An antistatic agent (A-5) formed by a block polymer was obtained in the same way as that in the Preparation of Example 8, except that instead of 60.9 parts of the secondarily modified polyolefin (b1-2), and 39.1 parts of PEG (a1-1) in the Preparation of Example 8, 59.0 parts of the modified polyolefin (b1-3) which has a hydroxyl group at two terminals of the polymer, 41.0 parts of (a1-1), and 6 parts of dodecane diacid were used. The melt viscosity of (A-5) is 130 Pa·s, SP is 8.8, and Mn is 25,000. (The average repeated number Nn is 3.6).

Preparation of Example 13

Preparation of an Antistatic Agent (A-6)

An antistatic agent (A-6) formed by a block polymer was obtained in the same way as that in the Preparation of Example 8, except that instead of 60.9 parts of the secondarily modified polyolefin (b1-2), and 39.1 parts of PEG (a1-1) in the Preparation of Example 8, 59.5 parts of the modified polyolefin (b1-4) which has an amino group at two terminals of the polymer, 40.5 parts of PEG (a1-1), and 6 parts of dodecane diacid were used. The melt viscosity of (A-6) is 150 Pa·s, SP is 8.8, and Mn is 28,000. (The average repeated number Nn is 4.0).

Preparation of Example 14

Preparation of an Antistatic Agent (A-7)

An antistatic agent (A-7) formed by a block polymer was obtained in the same way as that in the Preparation of Example 8, except that instead of 60.9 parts of the secondarily modified polyolefin (b1-2), and 39.1 parts of PEG (a1-1) in the Preparation of Example 8, 40.7 parts of (b1-2), and 59.3 parts of the cationic polymer (a2-1) were used. The melt viscosity of (A-7) is 210 Pa·s, SP is 8.7, and Mn is 29,000. (The average repeated number Nn is 2.6).

Preparation of Example 15

Preparation of an Antistatic Agent (A-8)

An antistatic agent (A-8) formed by a block polymer was obtained in the same way as that in the Preparation of Example 8, except that instead of 60.9 parts of the secondarily modified polyolefin (b1-2), and 39.1 parts of PEG (a1-1) in the Preparation of Example 8, 55.2 parts of (b1-2) and 44.8 parts of the anionic polymer (a3-1) were used. The melt viscosity of (A-8) is 190 Pa·s, SP is 9.4, and Mn is 28,000. (The average repeated number Nn is 3.6).

Preparation of Example 16

Preparation of an Antistatic Agent (A-9)

An antistatic agent (A-9) formed by a block polymer was obtained in the same way as that in the Preparation of Example 8, except that instead of 60.9 parts of the secondarily modified polyolefin (b1-2), and 39.1 parts of PEG (a1-1) in the Preparation of Example 8, 20.3 parts of the polyamide (b2-1), which has a carboxyl group at two terminals, and 79.7 parts of an EO adduct (a1-2) of bisphenol A (which has an Mn of 4,000, and a volume intrinsic resistance of $2 \times 10^7$ Ω·cm), were used. The melt viscosity of (A-9) is 250 Pa·s, SP is 11.0, and Mn is 23,000. (The average repeated number Nn is 4.6).

Preparation of Example 17

Preparation of an Antistatic Agent (A-10)

In a stainless steel autoclave, 85.7 parts of PEG (a1-1) and 14.3 parts of MDI were added and reacted at 90° C. to obtain PEG (a1-3), which was modified at an terminal with an isocyanato group (which had a NCO content of 3.0%, and a volume intrinsic resistance of $1\times10^7$ Ω·cm). Then, 47.3 parts of (a1-3) and 52.7 parts of the modified polyolefin (b1-3), which has a hydroxyl group at two terminals of the polymer, were melt mixed at 200° C. by a twin-screw extruder at a residence time of 30 s, taken out as a strand, and then pelleted to obtain an antistatic agent (A-10) formed by a block polymer. The melt viscosity of (A-10) is 140 Pa·s, SP is 9.2, and Mn is 25,000. (The average repeated number Nn is 3.6).

Preparation of Example 18

Preparation of an Antistatic Agent (A-11)

An antistatic agent (A-11) formed by a block polymer was obtained in the same way as that in the Preparation of Example 17, except that instead of 47.3 parts of (a1-3) and 52.7 parts of (b1-3) in the Preparation of Example 17, 38.9 parts of (a1-3), and 61.1 parts of the modified polyolefin (b1-4), which has an amino group at two terminals of the polymer, were used. The melt viscosity of (A-11) is 150 Pa·s, SP is 9.3, and Mn is 24,000. (The average repeated number Nn is 3.4).

Preparation of Comparative Example 1

Preparation of an Antistatic Agent (Comparative A-1)

An antistatic agent (comparative A-1) formed by a block polymer was obtained in the same way as that in the Preparation of Example 8, except that the polymerization time in the Preparation of Example 8 was changed from 4 hrs to 2 hrs. The melt viscosity of (comparative A-1) is 20 Pa·s, SP is 8.8, and Mn is 16,000. (The average repeated number Nn is 2.2).

Preparation of Comparative Example 2

Preparation of an Antistatic Agent (Comparative A-2)

An antistatic agent (comparative A-2) formed by a block polymer was obtained in the same way as that in the Preparation of Example 8, except that the polymerization time in the Preparation of Example 8 was changed from 4 hrs to 40 hrs. The melt viscosity of (comparative A-2) is 400 Pa·s, SP is 8.8, and Mn is 72,000. (The average repeated number Nn is 10.0).

Examples 1-18, and Comparative Examples 1-11

According to the formulations in Tables 1 and 2, the ingredients were blended for 3 min. by a Henschel mixer, and then melt mixed at a melt temperature of 220° C. by a twin-screw extruder fitted with a belt at 100 rpm at a residence time of 5 min to obtain a resin composition (Examples 1-18 and Comparative Examples 1-11).

Example 19

60 parts of (A-1), 40 parts of (B-1), 3 parts of (C1-1), and 2 parts of (C4-1) were blended for 3 min by a Henschel mixer, and then melt mixed at a melt temperature of 220° C. by a twin-screw extruder fitted with a band at 100 rpm at a residence time of 5 min. to obtain a master batch resin composition (M-1).

Then, 95 parts of (B-1) in 5.25 parts of (M-1) was blended for 3 min by a Henschel mixer and further melt mixed at a melt temperature of 220° C. by a twin-screw extruder fitted with a belt at 100 rpm at a residence time of 5 min to obtain a resin composition.

Markers in Tables 1 and 2 represent the following contents.

B-1: HIPS resin [Trade name "HIPS 433", manufactured by PS Japan Co., Ltd] Melt viscosity: 160 Pa·s and SP: 10.6

B-2: ABS resin [Trade name "Cevian 680SF", manufactured by Daicel Polymer Co., Ltd] Melt viscosity: 400 Pa·s, and SP: 11.7

B-3: PC/ABS resin [Trade name "Cycloloy C6600", manufactured by SABIC Innovative Plastics (Japan) Co., Ltd] Melt viscosity: 550 Pa·s, and SP: 11.4

B-4: modified PPE resin [Trade name "Noryl V-095", manufactured by SABIC Innovative Plastics (Japan) Co., Ltd] Melt viscosity: 580 Pa·s, and SP: 11.2

B-5: PP resin [Trade name "PM771M", manufactured by SunAllomer Co., Ltd]Melt viscosity: 170 Pa·s, and SP 8.0

C1-1: 1-ethyl-3-methylimidazolium bis(trifluoromethylsulfonyl)imide

C1-2: dodecylbenzenesulfonic acid sodium salt

C2-1: Epoxylated polystyrene-based elastomer [Trade name "Epofriend AT501", manufactured by Daicel Chemical Industry Co., Ltd, compatibilizer]

C4-1: antioxidant [Trade name "Irganox1010", manufactured by Ciba Specialty Chemicals Co., Ltd, tetrakis[methylene-3-(3',5'-di-t-butyl-4'-hydroxyphenyl)propionate] methane.

<Performance Test>

The obtained resin composition was fabricated into a molded article (100×100×2 mm, and 100×10×32 mm) by using an injection molding machine [model "PS40E5ASE", manufactured by Nissei Plastic Industrial Co., Ltd.; the same below] at a cylinder temperature of 220° C. and a mold temperature of 50° C. Then, the performance evaluation tests of the following items were carried out. The results were shown in Tables 1, and 2.

<Performance Evaluation Items>

(1) Surface Intrinsic Resistance

The surface intrinsic resistance was determined according to ASTM D257 (1984). The test was conducted with a test piece (100×100×2 mm) by using an ultra megohm meter [model "DSM-8103", manufactured by DKK-TOA co., Ltd] in a gas environment at 23° C. with a humidity of 50% RH.

(2) Impact Strength

The Impact strength is tested according to ASTM D256 Method A (fitted with a notch and being 3.2 mm thick).

(3) Appearance (3-1) Surface Appearance

The appearance of a surface and a rear surface of an injection molded article (100×100×2 mm) was observed and evaluated according to the following standards.

(Evaluation Standards)

○ No abnormality, good (equivalent to the thermoplastic resin without the antistatic agent).

x Surface irregularity and blister are observed.

(3-2) Cross-Section Appearance

A test piece (100×100×2 mm) was cut, with a cutter, at a central part of a plane and in a direction that is vertical to the plane of the piece, and the cross section was observed and evaluated according to the following standards.

(Evaluation Standards)

○ The cross section is even and good (equivalent to the thermoplastic resin without the antistatic agent).

x The cross section is layered, and uneven.

TABLE 1

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Formulation composition | Antistatic agent | A-1 | 1 | 3 | 3 | 3 | 3 | 3 | 10 | 10 | | |
| | | A-2 | | | | | | | | | 3 | |
| | | A-3 | | | | | | | | | | 3 |
| | | A-4 | | | | | | | | | | |
| | | A-5 | | | | | | | | | | |
| | | A-6 | | | | | | | | | | |
| | | A-7 | | | | | | | | | | |
| | | A-8 | | | | | | | | | | |
| | | A-9 | | | | | | | | | | |
| | | A-10 | | | | | | | | | | |
| | | A-11 | | | | | | | | | | |
| | | Comparative A-1 | | | | | | | | | | |
| | | Comparative A-2 | | | | | | | | | | |
| | Thermoplastic resin | B-1 | 99 | 97 | | | | | 97 | 90 | 97 | 97 |
| | | B-2 | | | 97 | | | | | | | |
| | | B-3 | | | | 97 | | | | | | |
| | | B-4 | | | | | 97 | | | | | |
| | | B-5 | | | | | | | | | | |
| | Antistatic promoter | C1-1 | 0.05 | 0.15 | 0.15 | 0.15 | 0.15 | | 0.50 | | 0.15 | 0.15 |
| | | C1-2 | | | | | | 0.15 | | | | |
| | Compatibilizer | C2-1 | | | | 0.3 | | | | | | |
| | Antioxidant | C4-1 | 0.1 | 0.1 | 0.1 | 0.1 | 0.1 | 0.1 | 0.1 | 0.1 | 0.1 | 0.1 |
| | Master batch resin composition | M-1 | | | | | | | | | | |
| $\rho(B)/\rho(A)$ | | | 0.9 | 0.9 | 2.2 | 3.1 | 3.2 | 0.9 | 0.9 | 0.9 | 4.0 | 1.5 |
| $|SP_A-SP_B|$ | | | 1.8 | 1.8 | 2.9 | 2.6 | 2.4 | 1.8 | 1.8 | 1.8 | 1.8 | 1.8 |
| Evaluation of molded article | Surface intrinsic resistance ($\Omega$) | | $7 \times 10^{12}$ | $2 \times 10^{11}$ | $5 \times 10^{11}$ | $8 \times 10^{11}$ | $8 \times 10^{11}$ | $5 \times 10^{11}$ | $2 \times 10^{10}$ | $5 \times 10^{12}$ | $8 \times 10^{11}$ | $3 \times 10^{11}$ |
| | Izod impact strength (J/m) | | 110 | 100 | 150 | 90 | 90 | 110 | 95 | 95 | 110 | 100 |
| | Appearance | Surface | ○ | ○ | ○ | ○ | ○ | ○ | ○ | ○ | ○ | ○ |
| | | Cross section | ○ | ○ | ○ | ○ | ○ | ○ | ○ | ○ | ○ | ○ |

| | | | Examples | | | | | | | | |
|---|---|---|---|---|---|---|---|---|---|---|---|
| | | | 11 | 12 | 13 | 14 | 15 | 16 | 17 | 18 | 19 |
| Formulation composition | Antistatic agent | A-1 | | | | | | | | | |
| | | A-2 | | | | | | | | | |
| | | A-3 | | | | | | | | | |
| | | A-4 | 3 | | | | | | | | |
| | | A-5 | | 3 | | | | | | | |
| | | A-6 | | | 3 | | | | | | |
| | | A-7 | | | | 3 | | | | | |
| | | A-8 | | | | | 3 | | | | |
| | | A-9 | | | | | | 3 | | | |
| | | A-10 | | | | | | | 3 | | |
| | | A-11 | | | | | | | | 3 | |
| | | Comparative A-1 | | | | | | | | | |
| | | Comparative A-2 | | | | | | | | | |
| | Thermoplastic resin | B-1 | 97 | 97 | 97 | 97 | 97 | | 97 | 97 | 95 |
| | | B-2 | | | | | | | | | |
| | | B-3 | | | | | | | | | |
| | | B-4 | | | | | | | | | |
| | | B-5 | | | | | | 97 | | | |
| | Antistatic promoter | C1-1 | 0.15 | 0.15 | 0.15 | 0.15 | 0.15 | 0.15 | 0.15 | 0.15 | |
| | | C1-2 | | | | | | | | | |
| | Compatibilizer | C2-1 | | | | | | | | | |
| | Antioxidant | C4-1 | 0.1 | 0.1 | 0.1 | 0.1 | 0.1 | 0.1 | 0.1 | 0.1 | |
| | Master batch resin composition | M-1 | | | | | | | | | 5.25 |
| $\rho(B)/\rho(A)$ | | | 0.6 | 1.2 | 1.1 | 0.8 | 0.8 | 0.7 | 1.1 | 1.1 | 0.9 |
| $|SP_A-SP_B|$ | | | 1.8 | 1.8 | 1.8 | 1.9 | 1.2 | 3.0 | 1.4 | 1.3 | 1.8 |
| Evaluation of molded | Surface intrinsic resistance ($\Omega$) | | $5 \times 10^{11}$ | $4 \times 10^{11}$ | $3 \times 10^{11}$ | $3 \times 10^{11}$ | $5 \times 10^{11}$ | $7 \times 10^{11}$ | $4 \times 10^{11}$ | $3 \times 10^{11}$ | $1 \times 10^{11}$ |

TABLE 1-continued

| article | Izod impact strength (J/m) | | 110 | 110 | 110 | 110 | 110 | 80 | 110 | 100 | 100 |
|---|---|---|---|---|---|---|---|---|---|---|---|
| | Appearance | Surface | ○ | ○ | ○ | ○ | ○ | ○ | ○ | ○ | ○ |
| | | Cross section | ○ | ○ | ○ | ○ | ○ | ○ | ○ | ○ | ○ |

TABLE 2

| | | | Comparative Examples | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Formulation composition | Antistatic agent | A-1 | 3 | | | | | | | | | | |
| | | A-2 | | | | | | | | | | | |
| | | A-3 | | | | | | | | | | | |
| | | A-4 | | | | | | | | | | | |
| | | A-5 | | | | | | | | | | | |
| | | A-6 | | | | | | | | | | | |
| | | A-7 | | | | | | | | | | | |
| | | A-8 | | | | | | | | | | | |
| | | A-9 | | 3 | 15 | | | | | | | | |
| | | A-10 | | | | | | | | | | | |
| | | A-11 | | | | | | | | | | | |
| | | Comparative A-1 | | | | 3 | | 3 | | | | | |
| | | Comparative A-2 | | | | | 3 | | | | | | |
| | Thermoplastic resin | B-1 | | | 85 | 97 | 97 | | 100 | | | | |
| | | B-2 | | 97 | | | | | | 100 | | | |
| | | B-3 | | | | | | | | | 100 | | |
| | | B-4 | | | | | | | | | | 100 | |
| | | B-5 | 97 | | | | | 97 | | | | | 100 |
| | Antistatic promoter | C1-1 | 0.15 | 0.15 | 0.15 | 0.15 | 0.15 | 0.15 | | | | | |
| | | C1-2 | | | | | | | | | | | |
| | Compatibilizer | C2-1 | | | | | | | | | | | |
| | Antioxidant | C4-1 | 0.1 | 0.1 | 0.1 | 0.1 | 0.1 | 0.1 | 0.1 | 0.1 | 0.1 | 0.1 | 0.1 |
| | Master batch resin composition | M-1 | | | | | | | | | | | |
| $\rho(B)/\rho(A)$ | | | 0.9 | 1.6 | 0.6 | 8.0 | 0.4 | 8.5 | — | — | — | — | — |
| $|SP_A-SP_B|$ | | | 0.8 | 0.7 | 0.4 | 1.8 | 1.8 | 0.8 | — | — | — | — | — |
| Evaluation of molded article | Surface intrinsic resistance (Ω) | | $5 \times 10^{13}$ | $2 \times 10^{14}$ | $5 \times 10^{10}$ | $3 \times 10^{13}$ | $2 \times 10^{13}$ | $4 \times 10^{14}$ | $8 \times 10^{15}$ | $1 \times 10^{16}$ | $5 \times 10^{15}$ | $1 \times 10^{16}$ | $2 \times 10^{16}$ |
| | Izod impact strength (J/m) | | 80 | 150 | 90 | 110 | 110 | 80 | 110 | 150 | 90 | 90 | 80 |
| | appearance | Surface | ○ | ○ | ○ | ○ | ○ | ○ | ○ | ○ | ○ | ○ | ○ |
| | | Cross section | ○ | ○ | x | ○ | ○ | ○ | ○ | ○ | ○ | ○ | ○ |

As shown in Tables 1 and 2, it can be known that the resin composition of the present invention still can provide a molded article having an excellent permanent antistatic property, even in a case that the content of the antistatic agent contained in the composition is less than that in the prior art, and an excellent appearance and mechanical property in a wide content range.

Applicability in Industry

The antistatic resin composition of the present invention can impart an excellent antistatic property to a thermoplastic resin molded article without impairing the mechanical property or good appearance of the molded article, and thus can be widely used for a housing product [for home appliances•office automation (OA) machines, game machines, and commercial machines, and so on], a plastic container material [for example, trays used in a clean room (e.g. an integrated circuit (IC) tray or the like), and other containers, or the like], various buffer materials, packaging materials (e.g. packaging films, protective films, or the like), sheets of flooring material, artificial grass, felt, substrates of a tape (used, for example, in a semiconductor fabrication process, or the like), and materials for various molded articles (e.g. automobile parts, or the like), molded through various molding methods [injection molding, compression molding, calendaring molding, slush molding, rotational molding, extrusion molding, blow molding, foam molding, film molding (for example, cast method, tenter method, or inflation method), or the like], and is very useful.

What is claimed is:

1. An antistatic resin composition, comprising an antistatic agent (A) and a thermoplastic resin (B), wherein a melt viscosity ratio of the thermoplastic resin (B) to the antistatic agent (A) at 220° C. is 0.5-5, and an absolute value of a difference between solubility parameters (SPs) of the antistatic agent (A) and the thermoplastic resin (B) is 1.4-3.0.

2. The antistatic resin composition according to claim 1, wherein a weight ratio of the antistatic agent (A) to the thermoplastic resin (B) is 0.5/99.5-10/90.

3. The antistatic resin composition according to claim 1, wherein the antistatic agent (A) is a block polymer having a structure formed by alternatively bonding a block of a hydrophilic polymer (a) having a volume intrinsic resistance of $1 \times 10^5 - 1 \times 10^{11}$ Ω·cm and a block of a hydrophobic polymer (b) with at least a bond selected from the group consisting of an ester bond, an amide bond, an ether bond, a urethane bond, a urea bond and an imide bond.

4. The antistatic resin composition according to claim 3, wherein the hydrophilic polymer (a) is at least one selected from the group consisting of a polyether, a cationic polymer, and an anionic polymer.

5. The antistatic resin composition according to claim 3, wherein a number average molecular weight of the hydrophilic polymer (a) is 150-20,000.

6. The antistatic resin composition according to claim 3, wherein the hydrophobic polymer (b) is at least one selected from the group consisting of a polyolefin, a polyamide, a polyamide-imide, and a polyester.

7. The antistatic resin composition according to claim 3, wherein a number average molecular weight of the hydrophobic polymer (b) is 150-20,000.

8. The antistatic resin composition according to claim 3, wherein the proportion of the block of the hydrophilic polymer (a) is 20-80% based on the weight of the block polymer.

9. The antistatic resin composition according to claim 1, wherein the thermoplastic resin (B) is one or two or more selected from the group consisting of a polyphenylene ether resin, a polyolefin resin, a poly(meth)acrylic resin, polystyrene resin, a polyester resin, a polyamide resin, a polycarbonate resin, and a polyacetal resin.

10. The antistatic resin composition according to claim 1, further comprising one or two or more additives (C) selected from the group consisting of an antistatic promoter (C1), a compatibilizer (C2), a flame retardant (C3), and other additives (C4) for a resin.

11. The antistatic resin composition according to claim 10, wherein the antistatic promoter (C1) is one or two or more selected from the group consisting of an alkali metal salt, an alkaline earth metal salt, a surfactant, and an ionic liquid.

12. The antistatic resin composition according to claim 10, wherein the antistatic promoter (C1) is used in an amount of 0.001-10% based on a total weight of the antistatic agent (A) and the thermoplastic resin (B).

13. A master batch resin composition (M), comprising the antistatic agent (A) and the thermoplastic resin (B) of the antistatic resin composition according to claim 1, wherein the content of the antistatic agent (A) in the master batch resin composition (M) is 40-80 weight percent (wt %).

14. An antistatic resin molded article, formed by molding the antistatic resin composition according to claim 1.

15. A molded article, formed by coating and/or printing the molded article according to claim 14.

* * * * *